(12) United States Patent
Elsinawi et al.

(10) Patent No.: US 11,881,807 B1
(45) Date of Patent: Jan. 23, 2024

(54) PORTABLE SOLAR POWERED GENERATOR

(71) Applicant: KING FAISAL UNIVERSITY, Al-Ahsa (SA)

(72) Inventors: Abdulaziz Hassain Elsinawi, Al-Ahsa (SA); Ahmed Emad Almuhanna, Al-Ahsa (SA); Feras Fadhel Buzaid, Al-Ahsa (SA); Mahdi Hussain Ben Quti, Al-Ahsa (SA); Mohammed Shubber Alsaleh, Al-Ahsa (SA); Mohammed Radi Alhajji, Al-Ahsa (SA); Slim Adnene Chtourou, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/215,352

(22) Filed: Jun. 28, 2023

(51) Int. Cl.
| | |
|---|---|
| *H02S 10/40* | (2014.01) |
| *H02S 30/20* | (2014.01) |
| *H02S 20/30* | (2014.01) |
| *B60J 7/14* | (2006.01) |
| *B60L 8/00* | (2006.01) |
| *B60K 16/00* | (2020.01) |
| *B60K 11/06* | (2006.01) |

(Continued)

(52) U.S. Cl.
CPC ............. *H02S 10/40* (2014.12); *H02S 20/30* (2014.12); *H02S 30/20* (2014.12); *B60J 1/14* (2013.01); *B60J 7/141* (2013.01); *B60K 11/06* (2013.01); *B60K 2016/003* (2013.01); *B60L 8/003* (2013.01); *B60L 58/26* (2019.02); *B60L 2200/36* (2013.01); *B60Y 2200/141* (2013.01); *Y02T 10/7072* (2013.01)

(58) Field of Classification Search
CPC .......... H02S 10/40; H02S 20/30; H02S 30/20; B60J 1/14; B60J 7/141; B60K 11/06; B60K 2016/003; B60L 8/003; B60L 58/26; B60L 2200/36; B60Y 2200/141; Y02T 10/7072
See application file for complete search history.

(56) References Cited

U.S. PATENT DOCUMENTS

| | | | |
|---|---|---|---|
| 9,324,893 | B1 | 4/2016 | Kats et al. |
| 9,866,167 | B2 | 1/2018 | Chambe et al. |
| (Continued) | | | |

FOREIGN PATENT DOCUMENTS

| | | |
|---|---|---|
| CN | 107499145 A | 12/2017 |
| CN | 108347215 A | 7/2018 |
| (Continued) | | |

OTHER PUBLICATIONS

"Smartflower" by Smartflower, a blog post updated in Sep. 2022 and available online at: https://www.solarreviews.com/blog/solar-flower-smartflower-solar-tracker.

*Primary Examiner* — Michael Y Sun
(74) *Attorney, Agent, or Firm* — Nath, Goldberg & Meyer; Richard C. Litman

(57) ABSTRACT

A system and method for portable solar power generation is provided. The portable solar power generator will be mounted on a movable platform, making it easy to transport and install in different places. Using solar panels, the generator will create electricity, which will be stored in a battery and converted to alternating current (AC) via an inverter. The generator has a control panel that allows users to monitor and regulate power generation.

9 Claims, 23 Drawing Sheets

(51) Int. Cl.
  *B60L 58/26* (2019.01)
  *B60J 1/14* (2006.01)

(56) References Cited

U.S. PATENT DOCUMENTS

| | | | | |
|---|---|---|---|---|
| 2001/0033088 | A1* | 10/2001 | Terhaar | E05B 63/24 |
| | | | | 296/106 |
| 2019/0308513 | A1* | 10/2019 | Akhavan-Tafti | B60L 53/37 |
| 2023/0148064 | A1* | 5/2023 | Trombley | H02S 30/20 |
| | | | | 320/101 |
| 2023/0173898 | A1* | 6/2023 | Dawson | B60J 7/1607 |
| | | | | 296/100.06 |

FOREIGN PATENT DOCUMENTS

| | | | | |
|---|---|---|---|---|
| CN | 111162581 A | * | 5/2020 | F16F 15/02 |
| CN | 112532167 A | | 3/2021 | |
| CN | 212909403 U | | 4/2021 | |

\* cited by examiner

PORTABLE SOLAR POWERED GENERATOR

BACKGROUND

1. Field

The present disclosure relates to a system and method for power generation using a portable platform.

2. Description of the Related Art

In both military and civilian settings, the use of portable power generators has increased in importance, particularly in times of emergency and natural disasters. These generators provide a reliable source of electricity for a variety of uses, including lighting, communication, and medical equipment. Portable generators can be utilized in military environments to power field hospitals, command posts, and other vital infrastructure. Traditional gasoline-powered generators, on the other hand, have a number of drawbacks, including the need for frequent refueling, undesired emissions, and the potential for fuel leaks.

The first mobile solar-powered generator (Mobile Solar Trailer VTS2400C) is a trailer-mounted solar power generator that is designed to provide reliable and efficient energy to various applications. The tower dimensions of the system are 5850 mm in length, 2150 mm in width, and 2450 mm in height, with a weight of 4500 kg. The trailer is a three-axle type and comes equipped with 15" tire and rims, 4 manual stabilizer supports, an A-frame drawbar, and a 50 mm ball or 70 mm ring tow hitch. The system also includes specially designed mud guards and wheel chocks. Additionally, the system offers the option to include a Kipor 5 kva diesel generator. The mast of the system can be raised or extended manually, electrically, or hydraulically, and comes with safety features such as an auto lock, sensor, and safety valve. The mast height and 360-degree rotation are also optional. The system comes with 8 solar panels, each with a capacity of 325 W, and the batteries available are either B1800 with 12×150 Ah or B2400 with 16×150 Ah. The system has a wind rating speed of 100 km/h, making it suitable for use in most weather conditions.

In a second system, the MS-200, a solar generator is equipped with 6 LG monocrystalline modules rated at 350 watts each, capable of producing an average daily energy harvest of 15 kWh. The inverter has an output of 3.6 kW rated and 6 kW surge with a 120 Vac 60 Hz single phase. The battery capacity is 418 AH @ 48 Vdc (20 kWh) with a rated 2,000 cycles at 80% DOD. The generator comes in a 5'×9' enclosed trailer by LGS Industries with a rated GVWR of 3,850 pounds and features a side-entry door and double-rear doors. It also includes a smart battery meter and an industrial steel-case lead acid battery, automatic watering, and degassing system with an average battery life of 12-15 years. The generator is equipped with a generator/grid input and an interior light package. The remote monitoring system is also available, as well as an inverter upgrade, 120/240 Vac output, AGM batteries, lithium batteries, additional axle capacity, an on-board diesel generator, custom interior work, a cold weather insulation package, a hydrogen monitoring system, and an off-road high clearance package.

A third system, the AL3500, has a solar generator including 3 solar panels with a capacity of 380 W each, providing a power output of 24 VDC. The battery bank consists of 6 batteries with a capacity of 200 Ah each. The generator is mounted on a single axle trailer, equipped with 15 inch tires. The stabilizing system consists of 4 outriggers, and the drawbar is an A-frame design with a tow hitch compatible with 50 mm ball and 70 mm ring. The generator also includes mud guards and wheel chocks for added stability. There is no backup generator. The telescoping mast has a maximum height of 9.14 meters and is equipped with proximity sensors, cabling winches, and guide wires for safety. The mast can be deployed electronically or manually and is designed to withstand winds of up to 63 km/h. The equipment is mounted in a 16×16×12 inch box and the generator has a weight of approximately 3500 kg, excluding optional accessories. The generator has an overall length of 4.42 meters and a width of 5.16 meters when the solar panels are retracted and the stabilizing legs are deployed.

In the S-SOLAR98-7, a solar-powered PV energy supply island system is a versatile and robust solution for generating electricity in remote or off-grid locations. It is designed as a folding trailer and is capable of producing up to 2.4 kW of 50 Hz AC voltage (230V) by harnessing the power of the sun. The system is charged by unfolding the solar panels in an area with abundant sunlight and can be transported in a closed state to the site of operation. The generator is equipped with two earthed Schuko plug connections and two automatic circuit breakers, as well as a residual current circuit breaker for safety. The generator operates with a pure sine wave with a frequency of 50 Hz and has an efficiency rate of 85-90%. It has a low battery alarm function, protection against overload and short circuits, and a main input for battery recharging. The system can provide a maximum of 10 hours of continuous power consumption at 600 W and 24 hours at 250 W. The dimensions of the generator are 240 cm in length, 154 cm in width, and 125 cm in height, with an unfolded length of 405 cm. The system is made of galvanized steel and sheet steel with a scratch-resistant coating. The solar modules are set in aluminum frames and are sealed and hail-proof with a life expectancy of 25 years. The system comes with a mobile trailer, solar charge controller, and maintenance-free lead gel batteries. The generator is also available with two inverters at an extra charge, a main inverter with a 3 kW output and a second inverter with a 1 kW output for important consumers.

Using photovoltaic panels to convert sunlight into electricity, solar-powered generators are a clean and renewable alternative to conventional generators. Solar panels are typically installed on the roofs of buildings or on the ground, but these installations are impractical in mobile or temporary settings. In response to this need, portable solar-powered generators have been created, but their current designs as discussed above are frequently cumbersome and difficult to transport, limiting their utility in remote or harsh environments.

What is needed is a portable solar-powered generator that is simple to operate, making it suitable for both military and civilian use.

SUMMARY

In a first aspect, the present subject matter relates to a solar-powered generator that can be installed on the bed of a pickup truck and can have a compartment for batteries and other components. The solar-powered generator can include solar panels mounted on top of a housing, with a box that can slide out manually and/or automatically using linear track actuators to push the solar panels out and in as needed. The solar panels can be optimized for low-light conditions, which means they will be able to effectively capture and convert sunlight even on cloudy or overcast days. Accordingly, they can also withstand rough terrain and extreme weather such as wind, rain, and snow. The efficiency of the solar panels is a crucial factor in determining the overall performance of the generator, as more efficient panels can generate more electricity in a given time period. The size and number of solar panels used in the generator are also important considerations, as larger panels or a greater number of panels can produce more electricity but may increase the weight and size of the generator.

To maximize the efficiency of the solar panels, the generator is designed to track the movement of the sun throughout the day. This is possible through the use of linear actuators that can adjust the angle of the panels to follow the path of the sun. This can increase the amount of sunlight captured by the panels, leading to greater electricity production. The solar panels can also be pushed in and out using track linear actuators for easy transport and storage, protecting them from damage and the elements when they are not in use.

A battery pack can be used to store the electricity generated by the solar panels, and it can be designed to be easily replaceable to facilitate maintenance and upgrades. A larger battery pack can store more electricity and provide power for a longer period of time. The battery pack can be equipped with a charge controller that regulates the flow of electricity from the solar panels to the battery pack, ensuring that the battery is charged efficiently and safely. The battery pack can also be equipped with a battery management system (BMS) that monitors the health and performance of the battery and provides information on its state of charge, temperature, and other critical parameters.

An inverter can be responsible for converting the stored DC power to AC power, which is what most electronic devices and appliances require. The inverter can have built-in safety features to protect against overvoltage and overcurrent and can handle a wide range of power requirements efficiently. The quality and dependability of the inverter is crucial for ensuring the generator's performance, as a defective inverter can result in power outages and damage to connected devices. The power requirements of the intended load and the battery pack's size and capacity determine the size and type of inverter used in the generator.

In addition to these primary components, the generator can also feature a control panel that enables users to monitor and regulate the output of power. The control panel can display real-time information, such as the current power usage, battery level, and solar insolation, in addition to safety features such as overvoltage and overcurrent protection. The control panel can include diagnostic and monitoring tools to assist with maintenance and troubleshooting. The control panel is typically simple to operate and provides clear instructions and alerts to help users ascertain the generator's performance and monitor for any potential issues.

The present mobile solar-powered generator can also be designed to absorb shocks from being transported across rough terrain, which is accomplished by using straps to secure the generator to, for example, the pickup truck, and rubber stoppers to absorb any impact damage to the battery and solar panels.

In an embodiment, the present solar-powered generator can be compact and simple to operate, making it suitable for both military and civilian use. It can provide a dependable and clean electricity source in a variety of settings, including remote and harsh environments. By incorporating cutting-edge solar panels, a high-capacity battery pack, a high-quality inverter, and a user-friendly control panel, the generator can generate and store electricity in a safe and efficient manner. Its housing can protect the generator's components and make it easy to transport with a pickup truck, making it an ideal solution for mobile and temporary power needs.

Accordingly, in an embodiment, the present subject matter relates to a portable solar powered generator, comprising: a plurality of solar panels; a plurality of linear track actuators; a plurality of linear actuators; a plurality of LDR sensors; a solar panel box for storing said plurality of solar panels; and an electrical component box, wherein the portable solar powered generator is configured to be arranged in a pick-up truck bed.

A second aspect of the present subject matter is a method which, when implemented with the device, performs the function of generating solar power on a portable platform. In an embodiment, this aspect of the present subject matter relates to a method for portably generating solar power, comprising: mounting an electrical component box on a pickup truck bed; mounting a solar panel box atop said electrical component box in said pickup truck bed; initiating a deployment of a plurality of solar panels contained within said solar panel box into an open configuration; tracking movement of a sun across a sky; positioning the plurality of solar panels to follow the movement of the sun across the sky; and storing power generated by the plurality of solar panels in a plurality of batteries contained within said electrical component box.

These and other features of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF EMBODIMENTS

Figure 1:
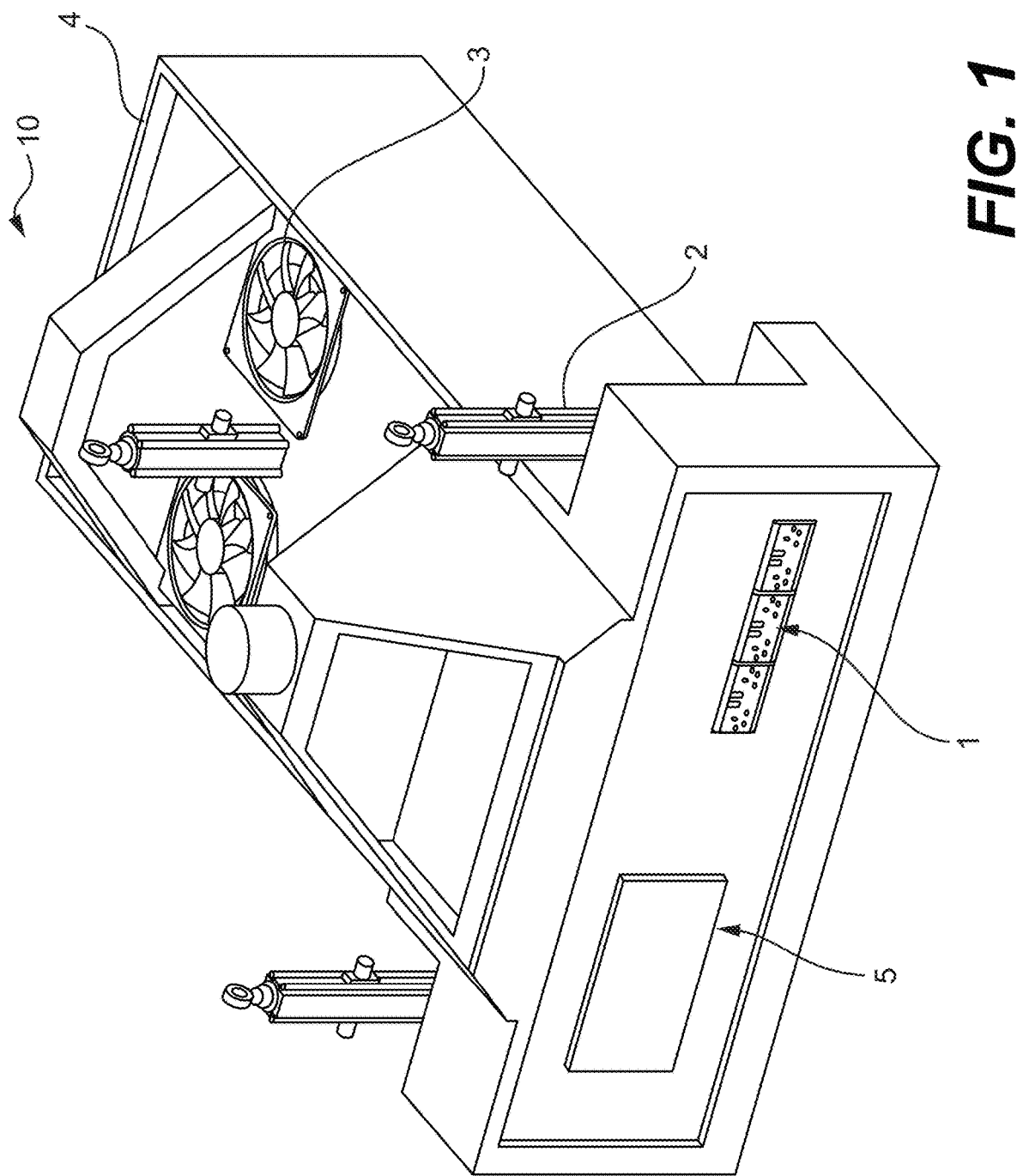
FIG. 1 is a diagram of the electrical component box of the system.

The following detailed description is merely exemplary in nature and is not intended to limit the described embodiments or the application and uses of the described embodiments. Any implementation described herein with the words "exemplary" or "illustrative" is not necessarily construed as preferred or advantageous over other implementations. All of the implementations described below are exemplary implementations provided to enable persons skilled in the art to make or use the embodiments of the disclosure and are not intended to limit the scope of the disclosure, which is defined by the claims.

For the purposes of the description herein, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed therein are not to be considered as limiting, unless the claims expressly state otherwise.

In an embodiment, the present subject matter relates to a portable solar powered generator, comprising: a plurality of solar panels; a plurality of linear track actuators; a plurality of linear actuators; a plurality of LDR sensors; a solar panel box for storing said plurality of solar panels; and an electrical component box, wherein the portable solar powered generator is configured to be arranged in a pick-up truck bed.

In one embodiment, the solar panel box can be mounted atop said electrical component box while being arranged in said pick-up truck bed. In this regard, the electrical component box can further comprise: a controller; a display; and a plurality of plugs.

In another embodiment, the plurality of solar panels can be stored within and atop said solar panel box in a closed configuration. In this regard, the plurality of solar panels stored within said solar panel box in the closed configuration can be extended outward away from said solar panel box in an open configuration.

In one embodiment, said plurality of solar panels stored within said solar panel box can be four, six, eight, ten, or more solar panels. Regardless of the number of solar panels present, the plurality of solar panels stored within said solar panel box can be extended outward away from said solar panel box in an open configuration using the plurality of linear track actuators. Similarly, the controller can control the position of the plurality of solar panels extended outward away from said solar panel box in an open configuration such that the panels are moved using the plurality of linear actuators to follow a sun's movement across a sky. In this regard, the plurality of linear actuators can adjust angles of the plurality of solar panels to follow a path of the sun's movement across the sky. In this regard, the movement of the solar panels using either the linear track actuators and/or the linear actuators can be done either manually or automatically. When automated, the system can reduce complexity for the user. However, having the ability to manually extend and move the solar panels is of critical importance for situations where the automated system has a failure, regardless of the reason.

In another embodiment, the electrical component box can further comprise a plurality of batteries for storing power. In a further embodiment, the electrical component box can further comprise an inverter for converting stored DC power to AC power. In a still further embodiment, the electrical component box can further comprise one or more fans for reducing air temperature within said electrical component box.

Figure 2:
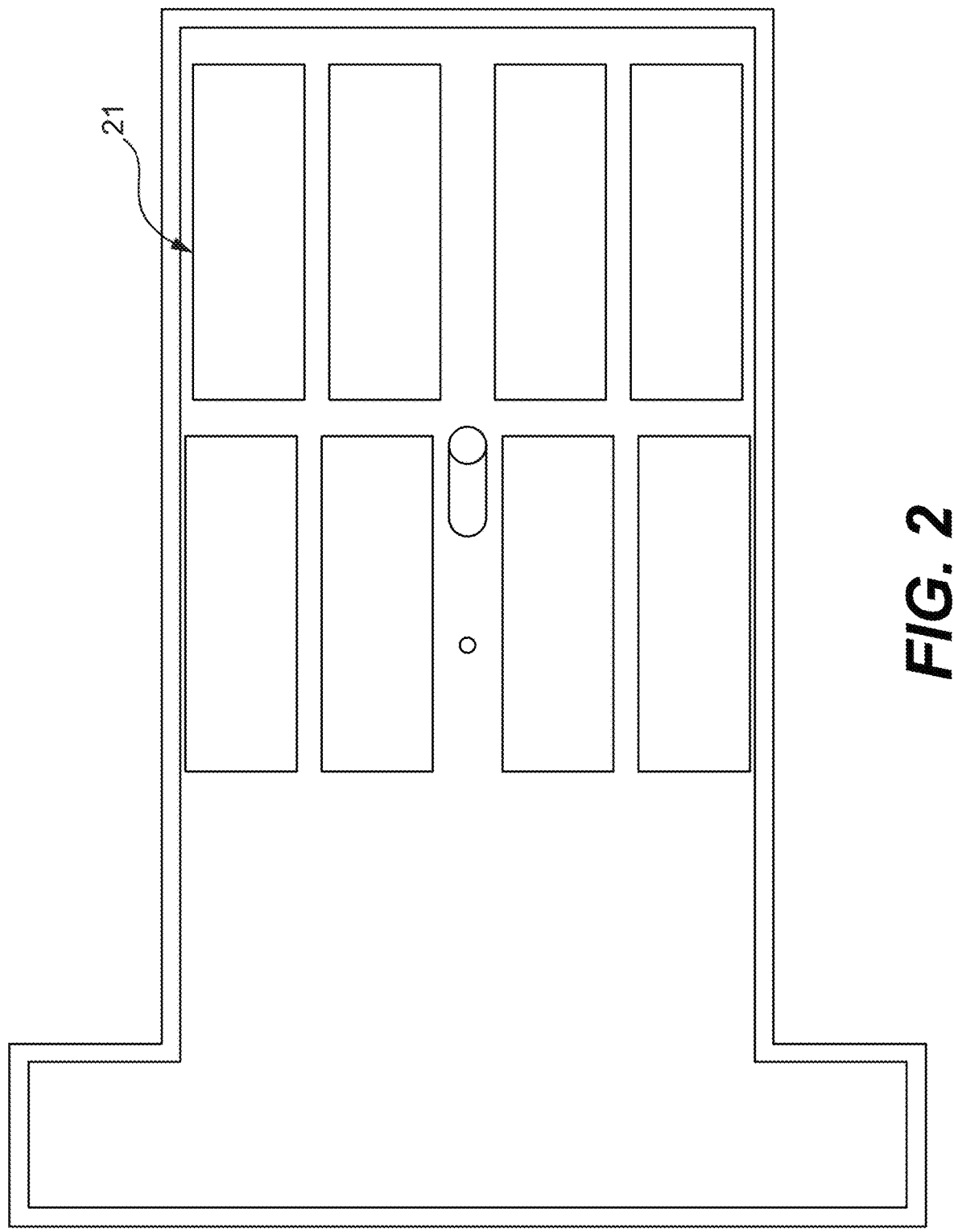
FIG. 2 is an inside view of the battery arrangement of the electric component box.
Figure 3:
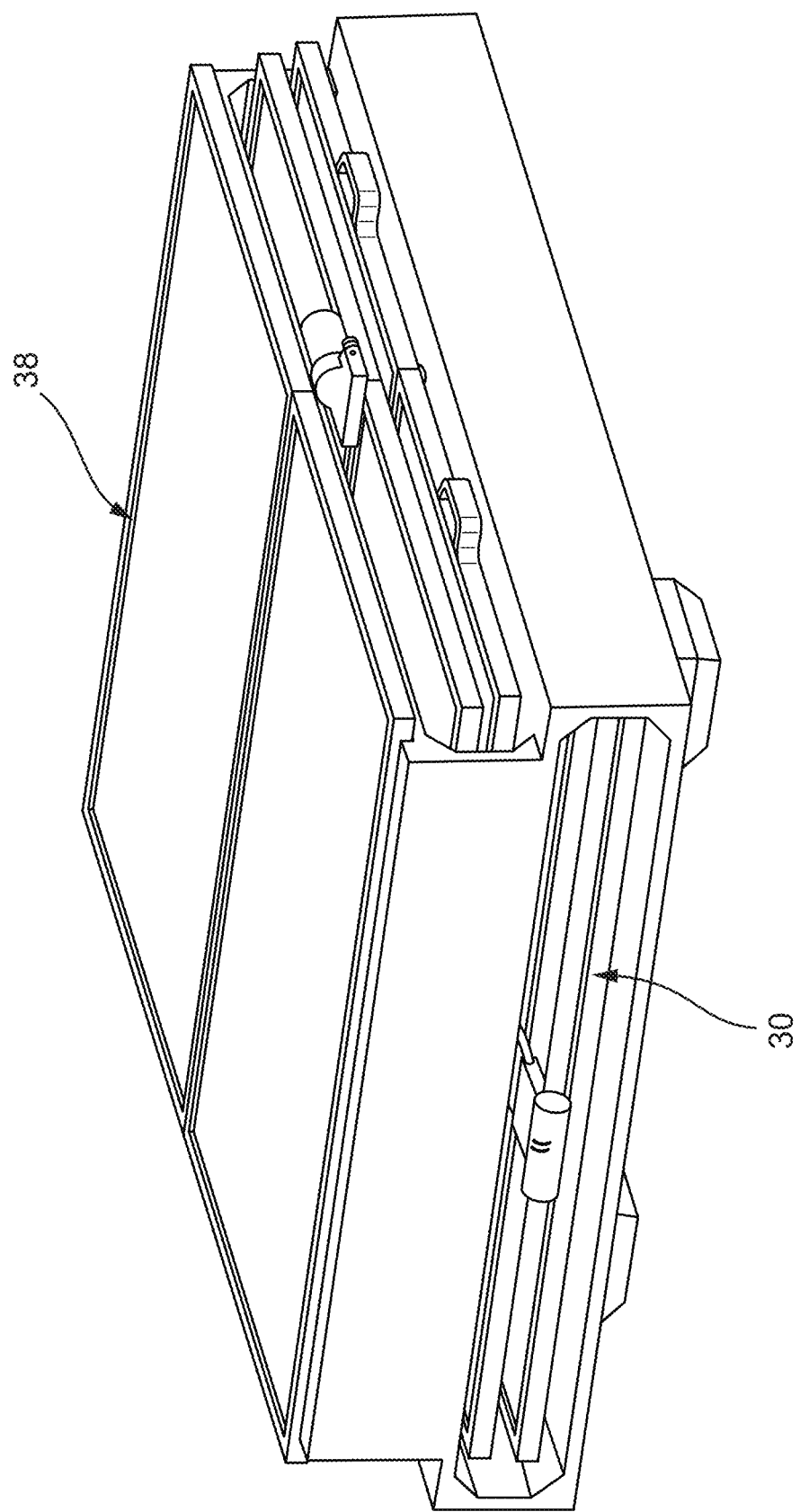
FIG. 3 is a view of the solar panel box in a closed configuration.
Figure 4:
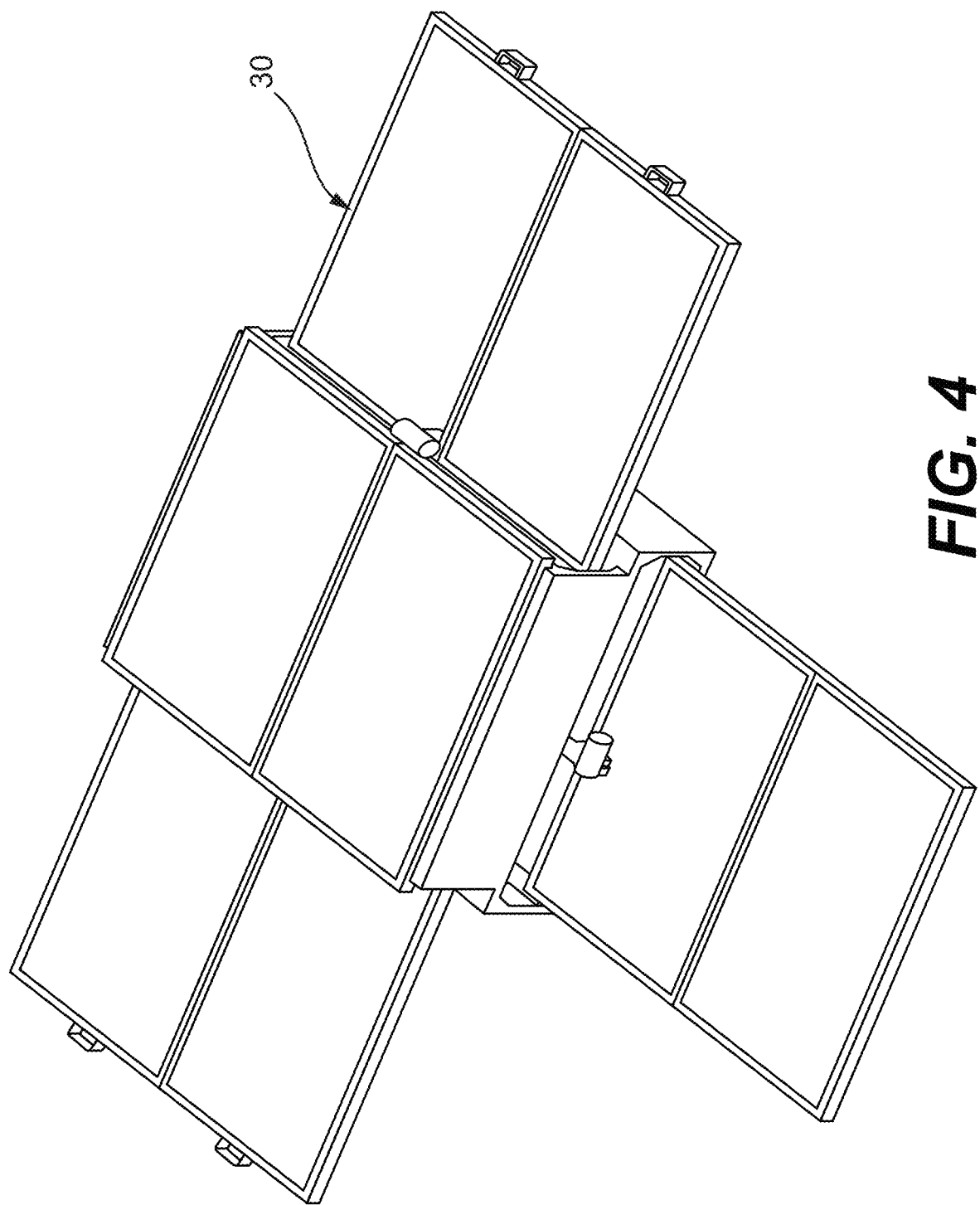
FIG. 4 is a view of the solar panel box in an open configuration.
Figure 5:
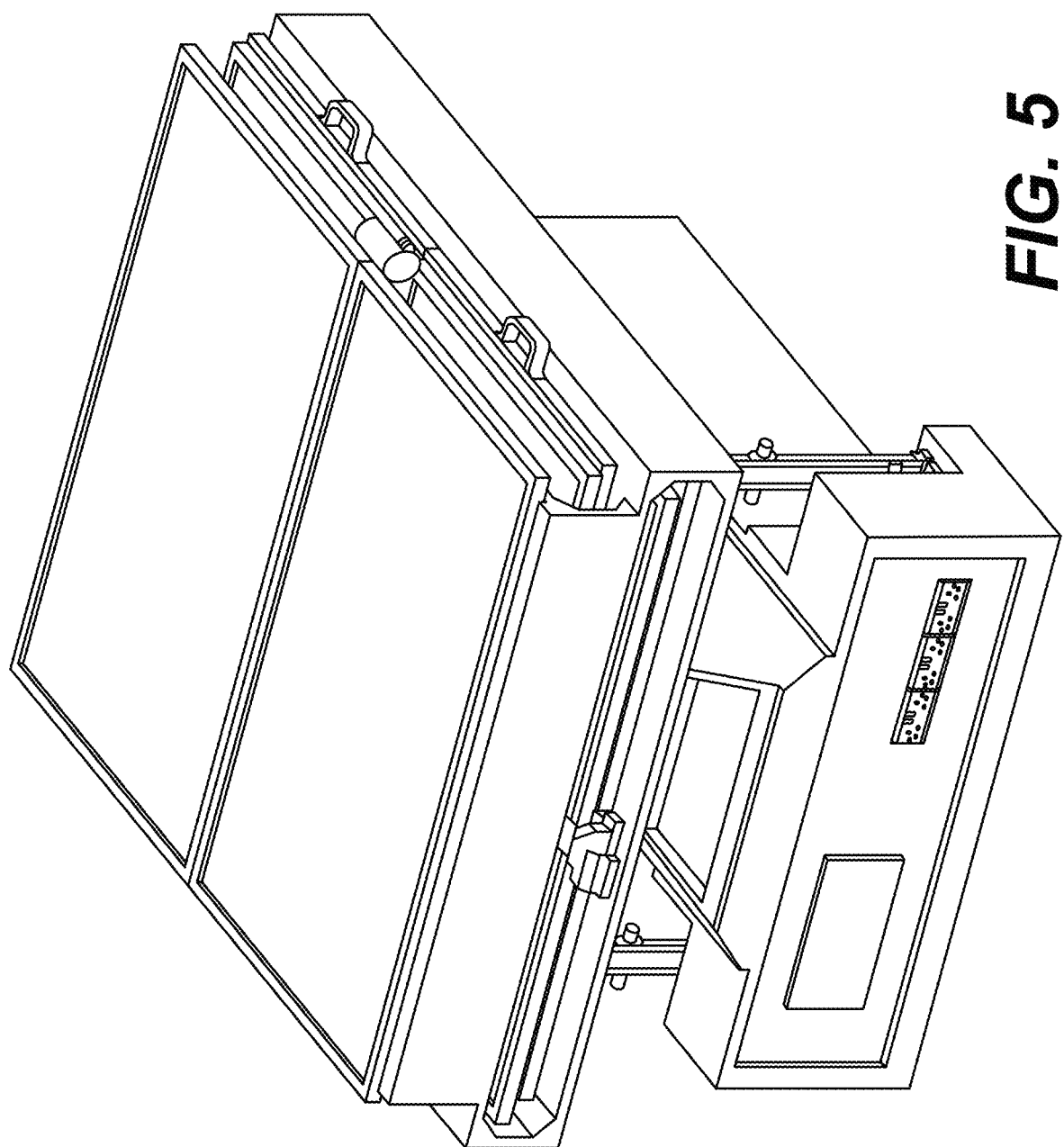
FIG. 5 is a diagram of the portable solar power generator with the solar panel box mounted on top of the electrical component box in a closed configuration.
Figure 6:
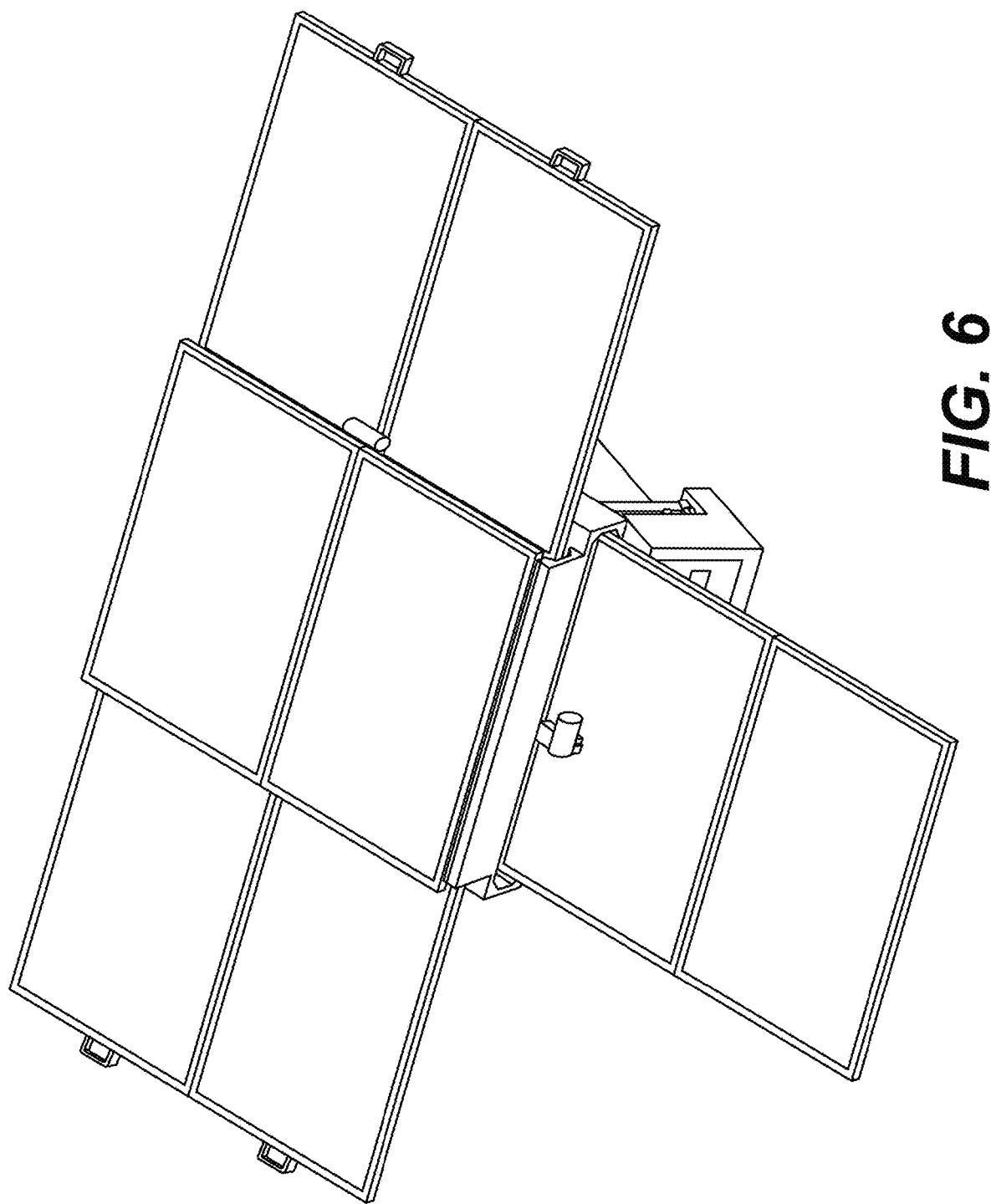
FIG. 6 is a diagram of the portable solar power generator with the solar panel box mounted on top of the electrical component box in open configuration.
Figure 17:
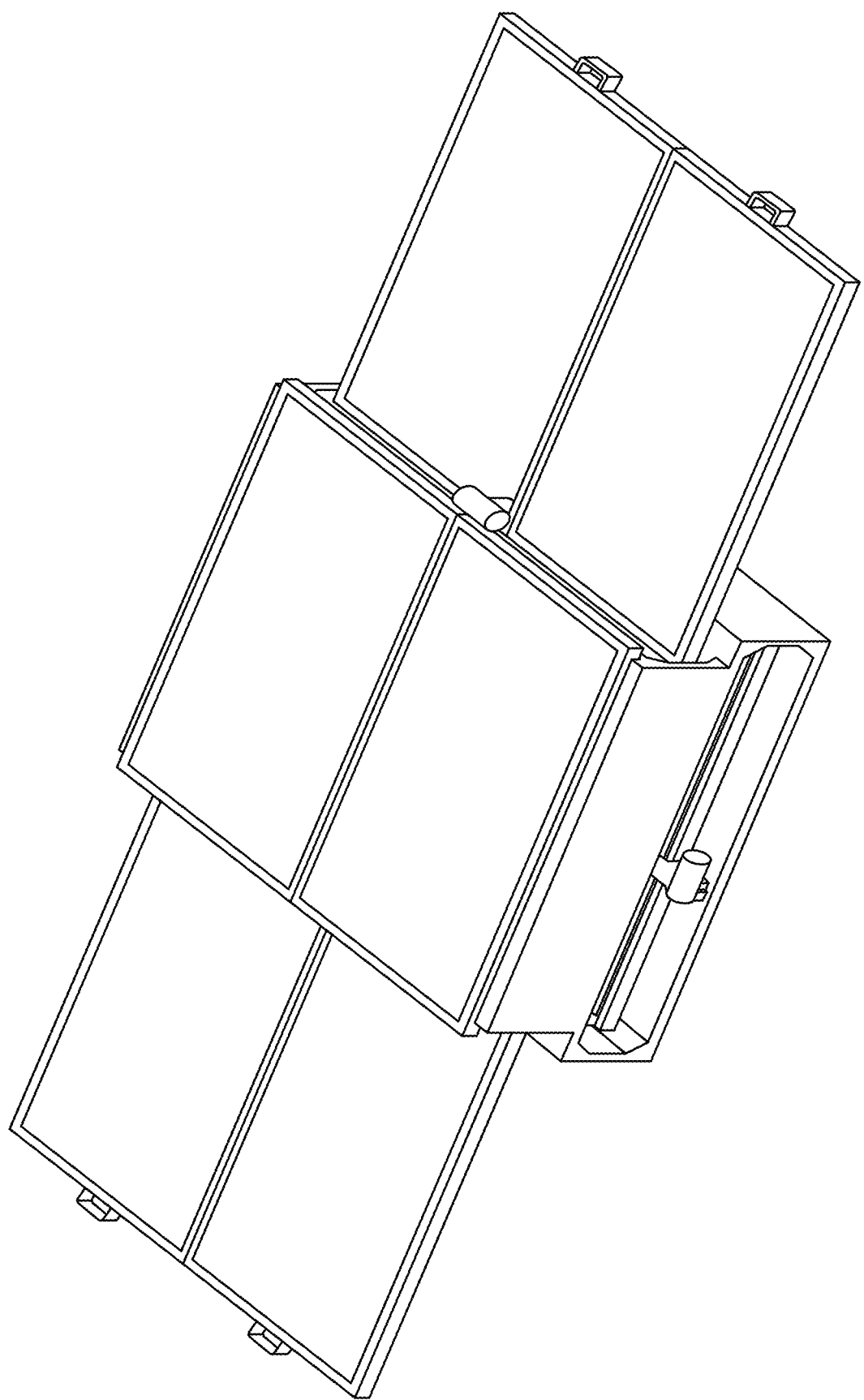
FIG. 17 is an alternative 6 panel embodiment of the solar panel box in an open configuration.
Figure 18:
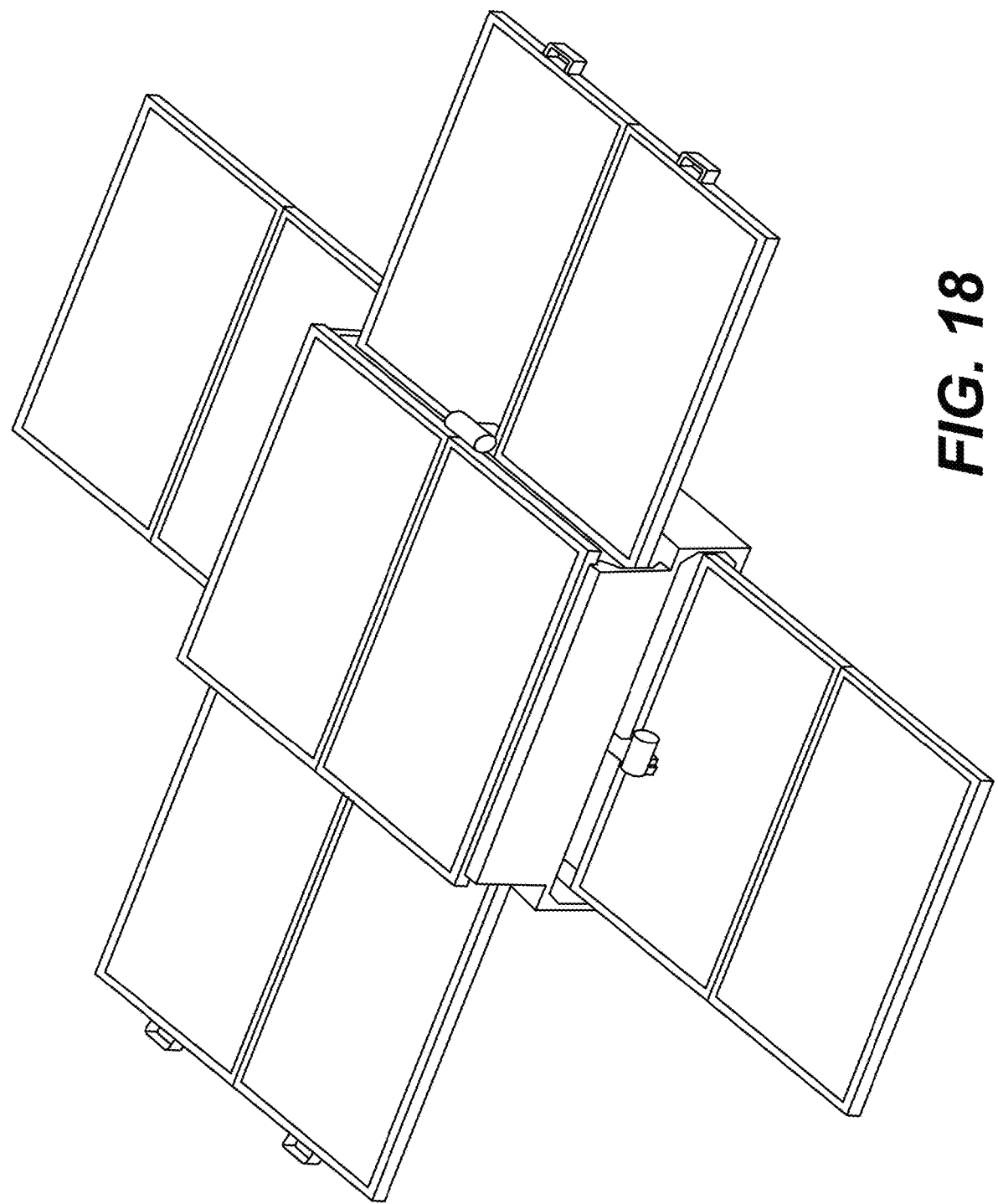
FIG. 18 is an alternative 10 panel embodiment of the solar panel box in an open configuration.

As shown in FIGS. 5-8, one embodiment of the Portable Solar Generator as described has a configuration of a solar panel box of 8 Batteries and 8 Solar Panels as in FIGS. 2-4, which offers a high energy storage capacity of 228 Ah×8, with a total energy storage capacity of 1824 Ah. In an alternative design as shown in FIG. 17, the Portable Solar Generator can have a configuration of 4 Batteries and 6 Solar Panels, and this configuration is presented as a cost-effective and less complex solution in case the primary design becomes too expensive to implement. With 4 batteries, the alternative design offers a total energy storage capacity of 912 Ah, which is lower compared to the primary design. The 6 solar panels generate a lower amount of energy compared to the primary design, but it still offers a reliable source of energy. Also, in the alternative design of FIG. 17, the solar tracking system can also be replaced with a single axis tracking system, by changing the angle using one actuator and to one side instead of a 3 degrees of freedom system with tracking in all directions. A second alternative has a solar panel box design of ten panels as shown in FIG. 18, which, given the additional panels, supplies the greatest amount of power of the designs described herein.

The main design focuses on a Portable Solar Generator with 8 Batteries and 8 Solar Panels, which offers a high energy storage capacity of 228 Ah×8, with a total energy storage capacity of 1824 Ah. According to this embodiment, the 8 solar panels can be connected to generate robust energy.

Figure 7:
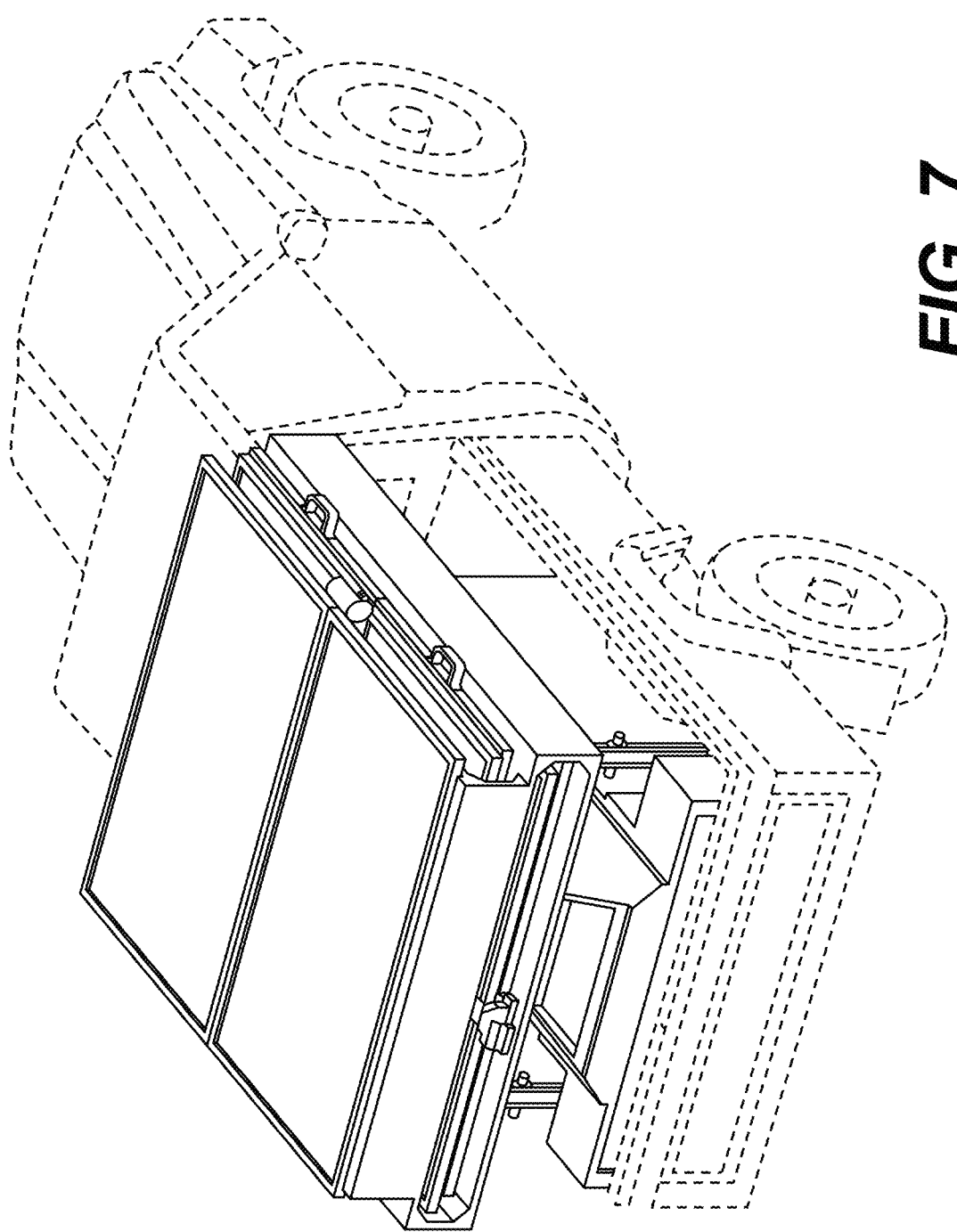
FIG. 7 is a diagram of the portable solar power generator with the solar panel box mounted on top of the electrical component box in a closed configuration as mounted on the back of a pick-up truck.
Figure 8:
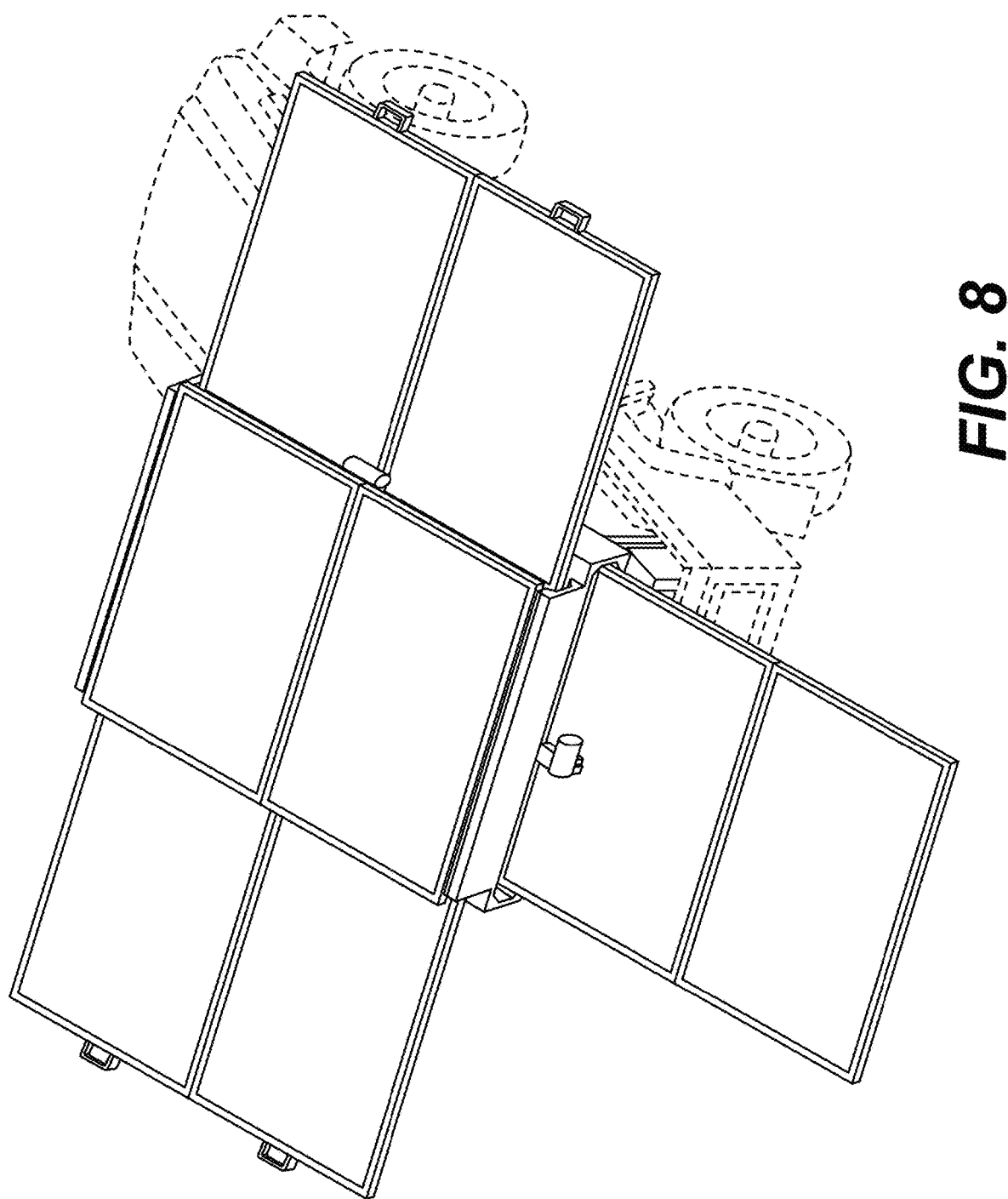
FIG. 8 is a diagram of the portable solar power generator with the solar panel box mounted on top of the electrical component box in an open configuration as mounted on the back of a pick-up truck.
Figure 9:
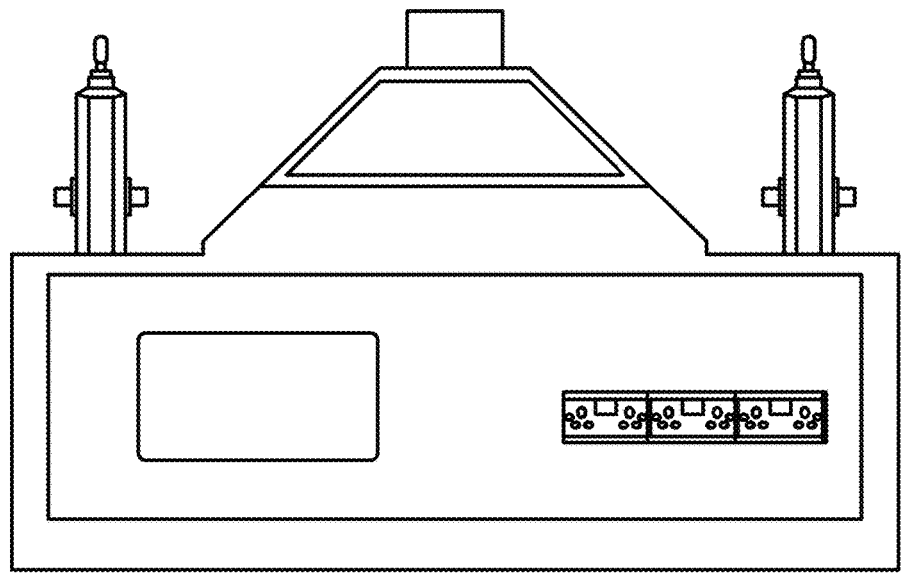
FIG. 9 is a front face view of the electrical component box.
Figure 10:
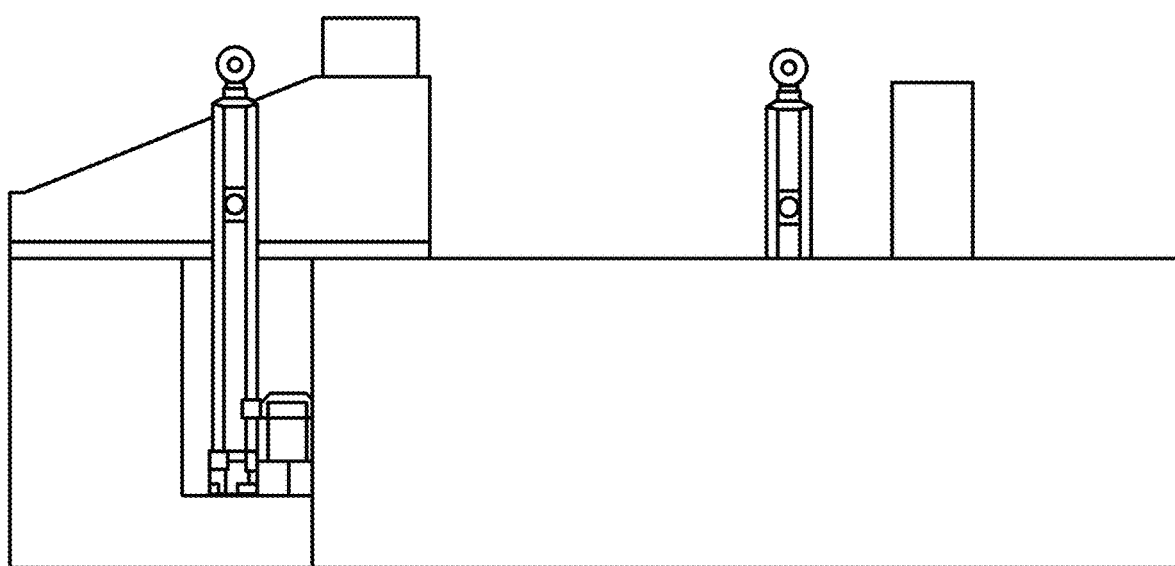
FIG. 10 is a side view of the electrical component box.
Figure 11:
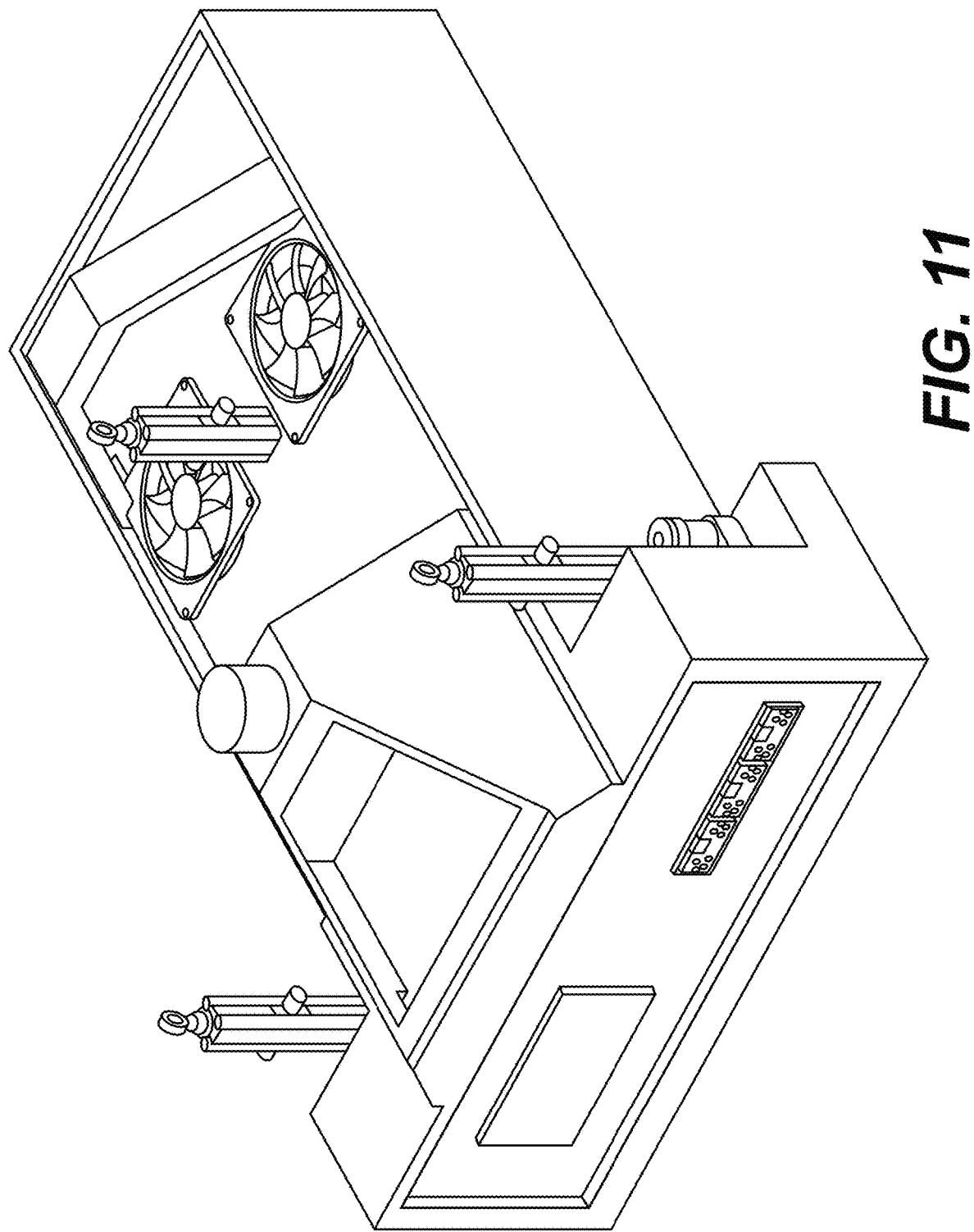
FIG. 11 is a ¾s view of the electrical component box.
Figure 12:
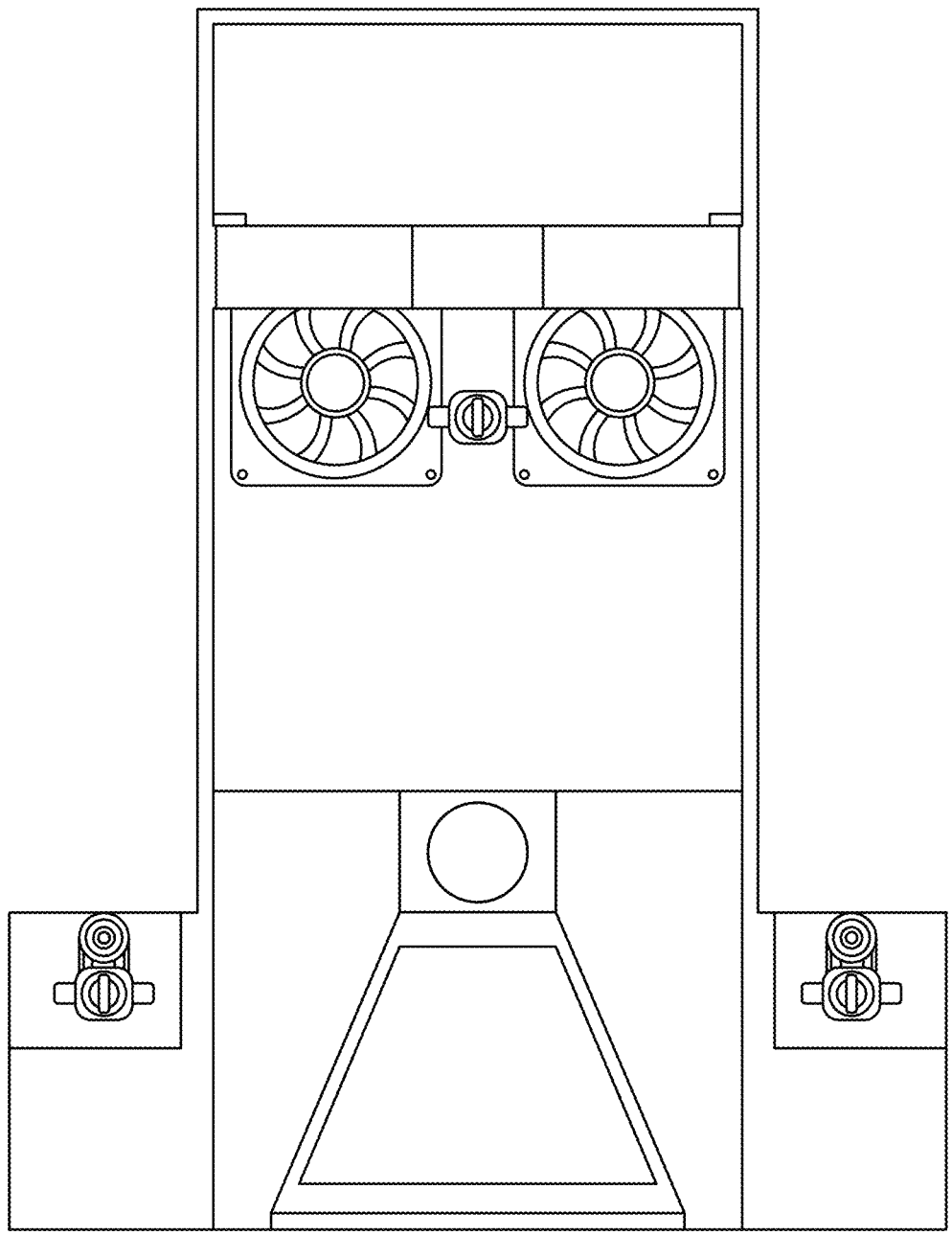
FIG. 12 is a top down view of the electrical component box.
Figure 13:
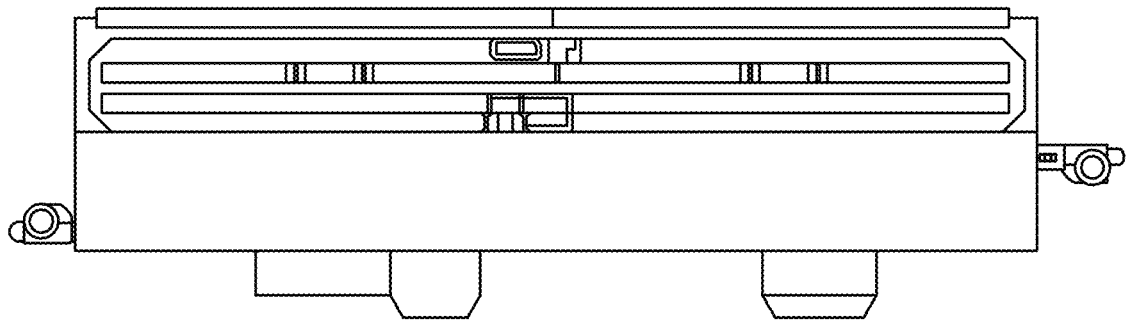
FIG. 13 is a front face view of the solar panel box.
Figure 14:
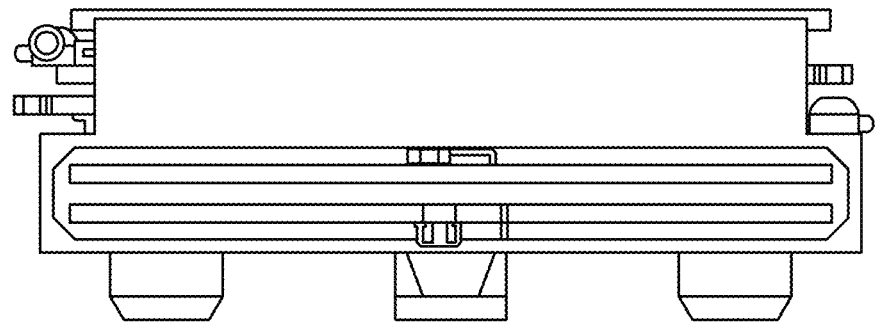
FIG. 14 is a side view of the solar panel box.
Figure 15:
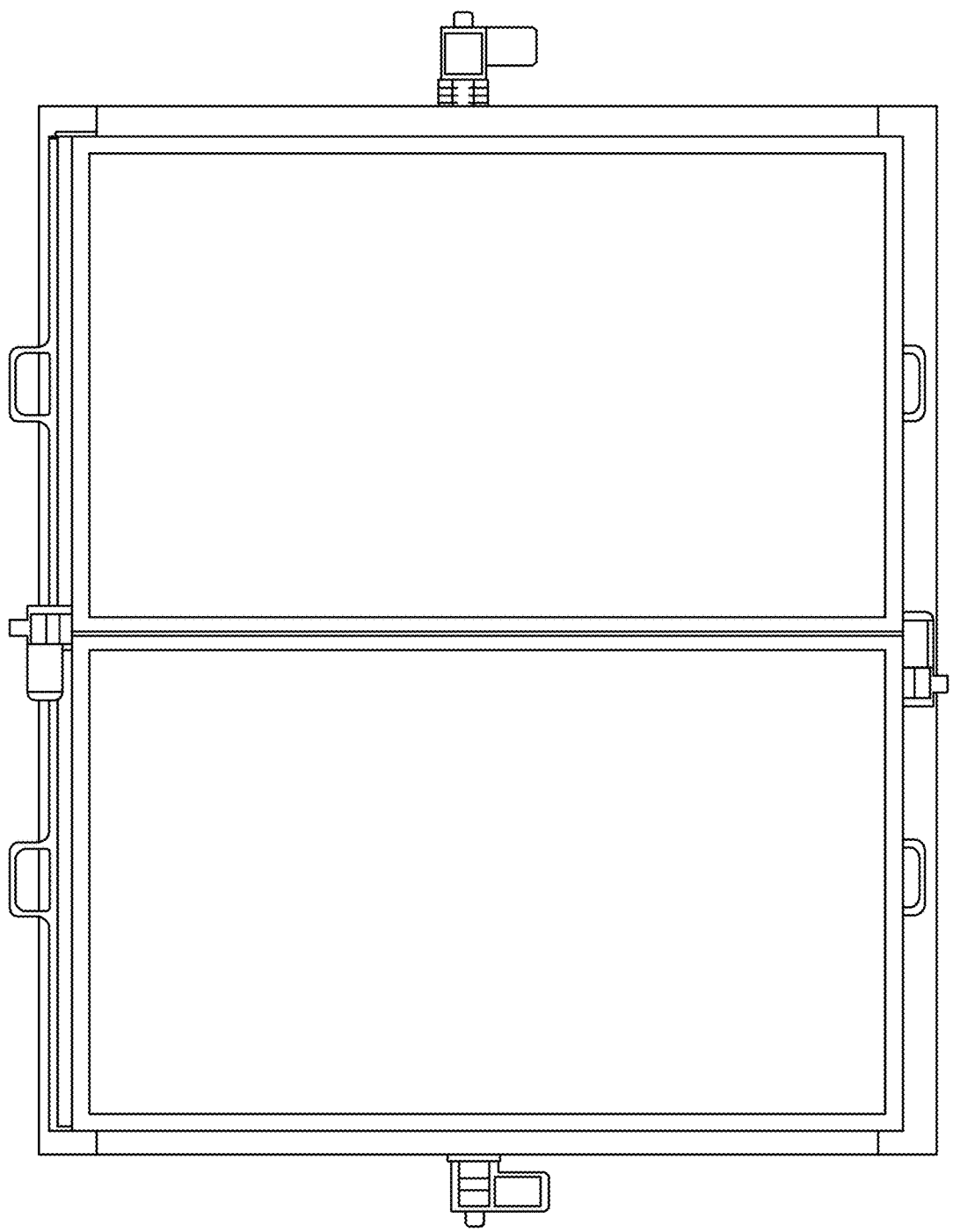
FIG. 15 is a top down view of the solar panel box.
Figure 16:
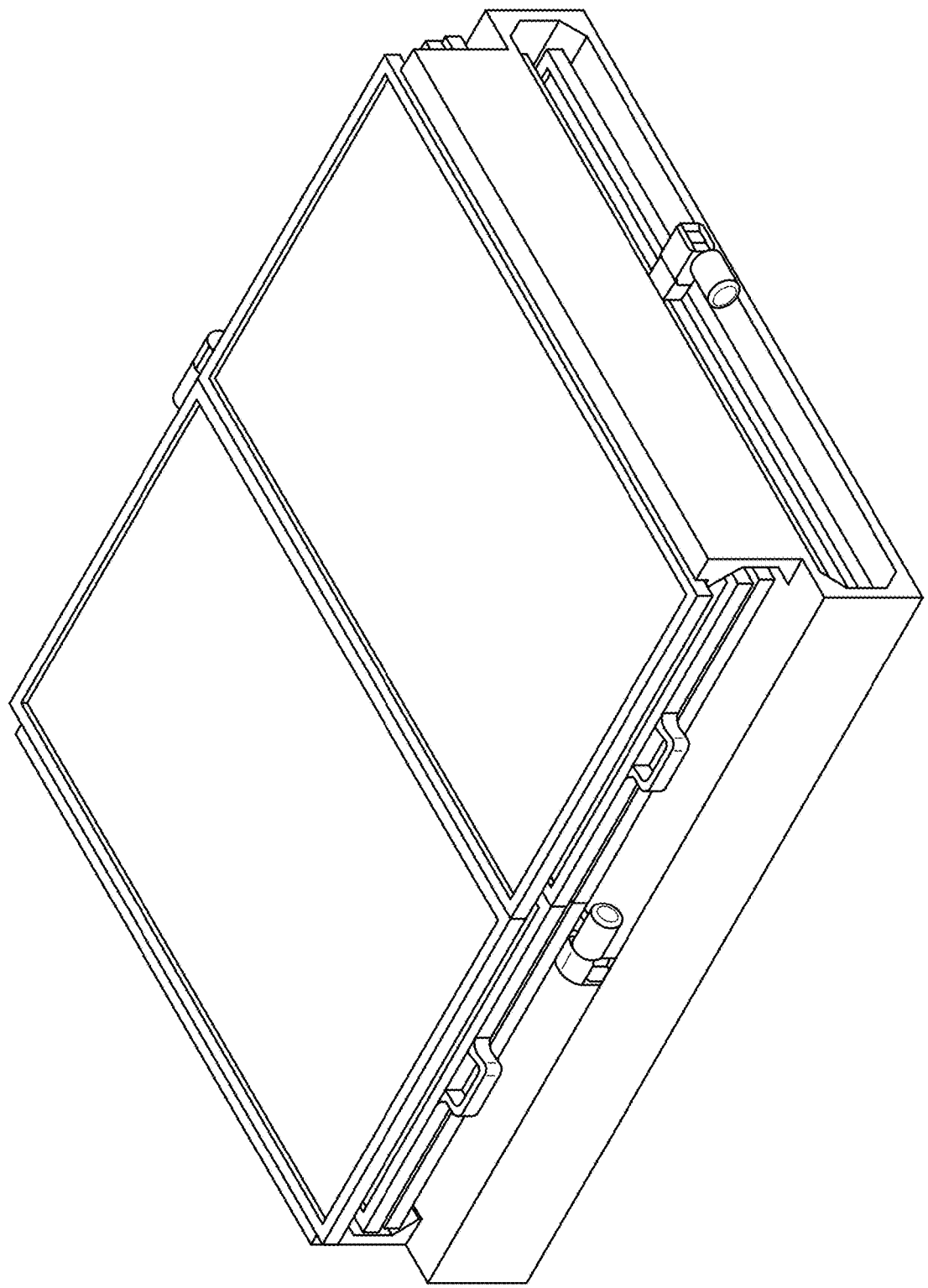
FIG. 16 is a ¾s view of the solar panel box.

The Portable Solar Generator system can contain two critical components: the Electrical Component Box of FIGS. 1-2 and 9-12 and the Solar Panel Box of FIGS. 3-4 and 13-16. The Electrical Component Box (10) houses a battery system (21), an inverter (not shown), plugs (1), a controller (ARDUINO MITRO), and a display screen (5) in a small protective enclosure (4). The battery system (21) stores the energy generated by the solar panels (30), which sit atop the Solar Panel Box and are securely held in place by sliders for convenient maintenance and transport as shown in FIG. 7-8. The inverter in the Electrical Component Box converts stored DC energy into AC energy that is compatible with most appliances and devices.

Power distribution can be regulated by controllers, and the front-panel display screen (5) can provide real-time information such as battery levels and power usage. The Electrical Component Box can also include plugs (1) for easy device connectivity and a continuous power supply. The design can remain consistent across different Portable Solar Generator system configurations, with only the number of batteries varying. Once a desired position is secured, the Portable Solar Generator can be deployed into an open configuration, as in FIGS. 6 and 8.

In certain embodiments, both the Electrical Component Box and the Solar Panel Box can be made of aluminum 7075 due to its high strength-to-weight ratio, excellent resistance to corrosion, and good thermal conductivity. These properties ensure durability and longevity in harsh outdoor environments, as well as efficient heat dissipation from the components housed within the boxes. The use of aluminum 7075 allows for a compact design, ensuring the portability of the system. This results in a versatile and efficient power solution suitable for a wide range of applications.

Figure 19:
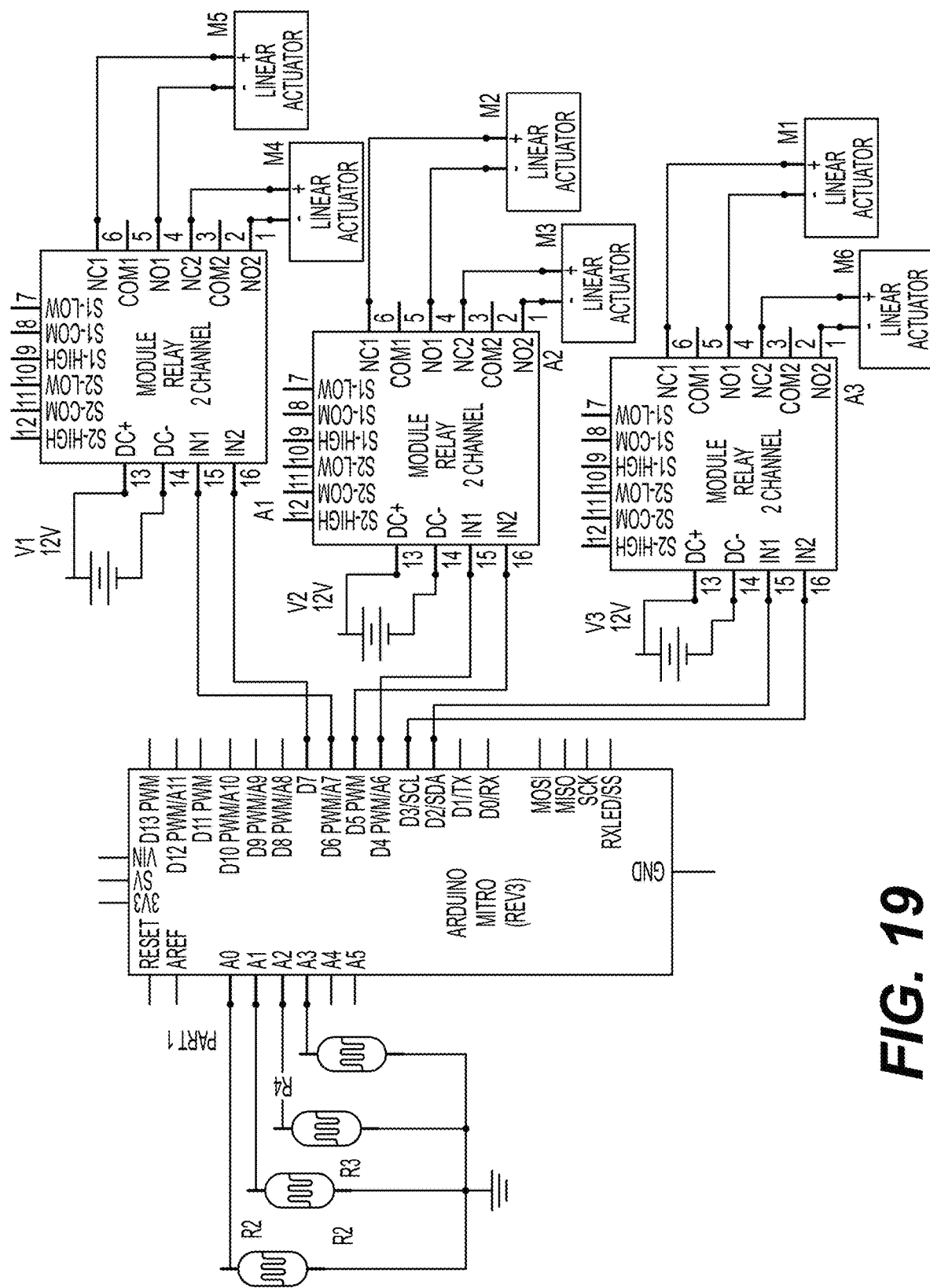
FIG. 19 is a circuit diagram for the tracking and automation system of the portable solar powered generator.

FIG. 19 is a schematic diagram depicting the integration of various components and systems. The schematic diagram includes three linear actuators (M1, M2, M5) and three linear track actuators (M3, M4, M6), two of each connected to a 2 channel relay (MODULE RELAY 2 CHANNEL), which in turn is connected to the Arduino board. Additionally, four LDR sensors (R1-R4) are connected to an Arduino board (ARDUINO MITRO), playing a crucial role in the automation and solar tracking system. Of the three linear actuators, three are used specifically for the solar tracking system, allowing for precise movement of the solar panels as they follow the movement of the sun. As shown in FIG. 3, the three track linear actuators (31) serve the purpose of extending and closing the solar panels (30), providing versatility and ease of use for the generator. The 2 channel relay controls the movement of the linear actuators and the LDR sensors (R1-R4) detect changes in light intensity, providing the necessary input to the Arduino board to adjust the position of the solar panels.

The incorporation of the Arduino board allows for easy control and customization of the solar tracking system, providing a more efficient solution than traditional fixed panel systems. The use of LDR sensors (R1-R4) and linear actuators (M3, M4, M6) makes it possible for the panels (30) to be adjusted to follow the movement of the sun throughout the day, maximizing energy production and ensuring reliable, clean energy in any setting. The schematic diagram provides a comprehensive overview of the design and integration of these components, making it a valuable tool for the optimization and implementation of the portable solar generator.

Advanced simulation tools such as ANSYS Fluent and SimScale were used to conduct CFD and FEA load testing. These tests provided crucial insights into the performance and behavior of the generator under various conditions and loads. The results of the CFD and FEA load testing were used to optimize the design, identify potential issues, and ensure that the generator could handle the loads it would be subjected to in the field. The use of ANSYS Fluent and SimScale, combined with the schematic diagram, was used accurately to predict the performance of the generator, and make any necessary adjustments to ensure optimal performance.

Figure 20:
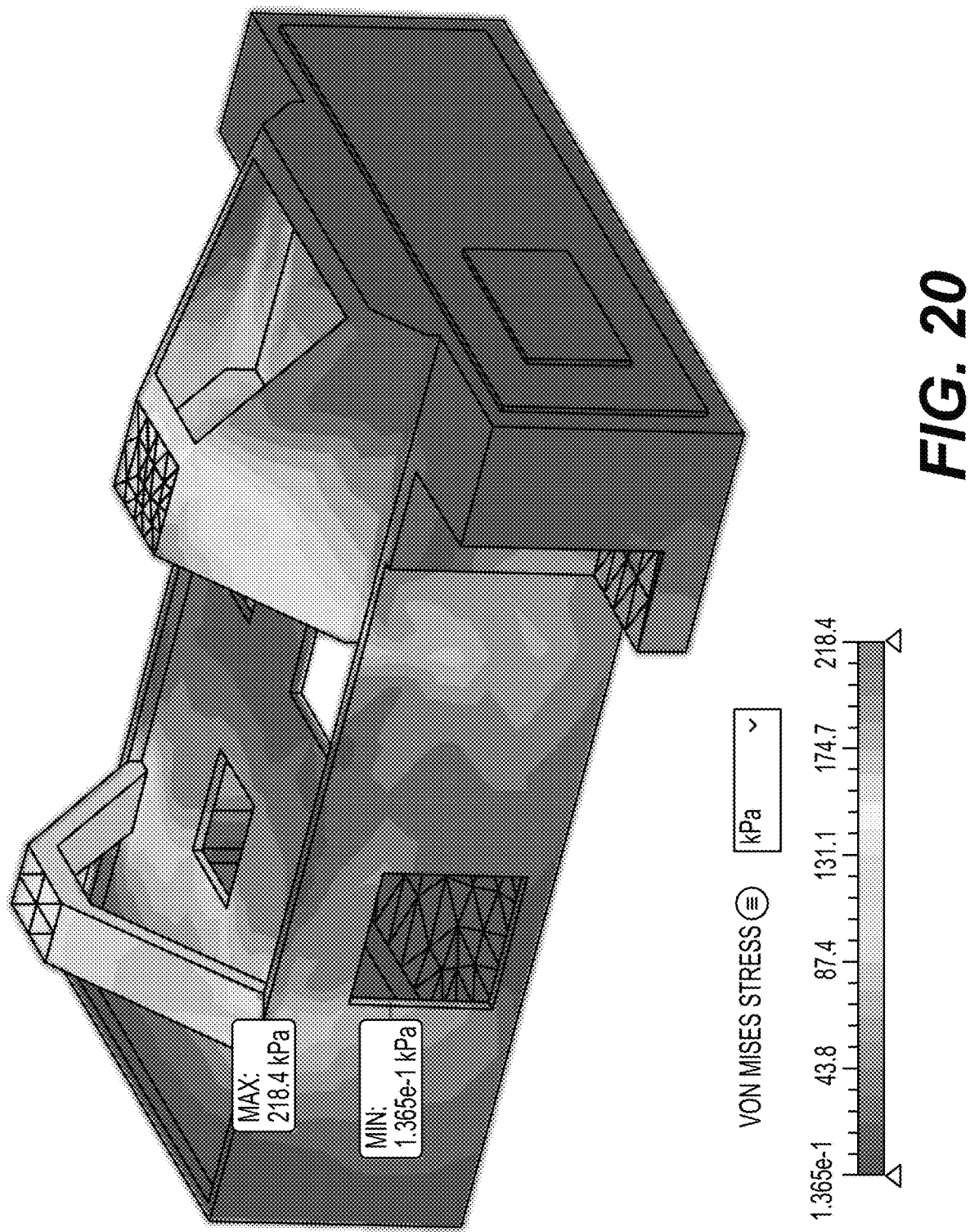
FIG. 20 is a volumetric graphic depiction of the electrical component box Von mises stress.
Figure 21:
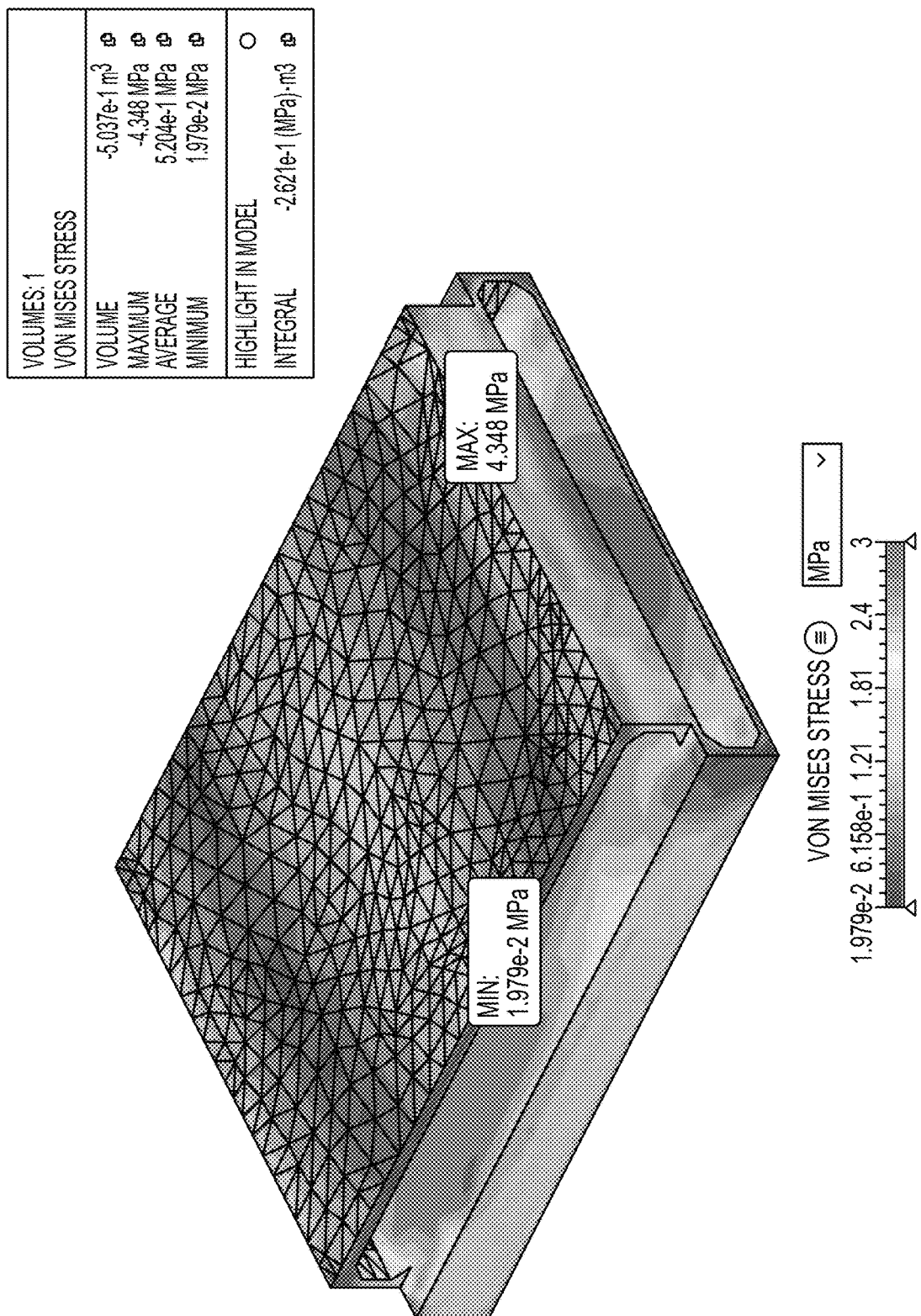
FIG. 21 is a volumetric graphic depiction of the solar panel box Von mises stress.
Figure 22:
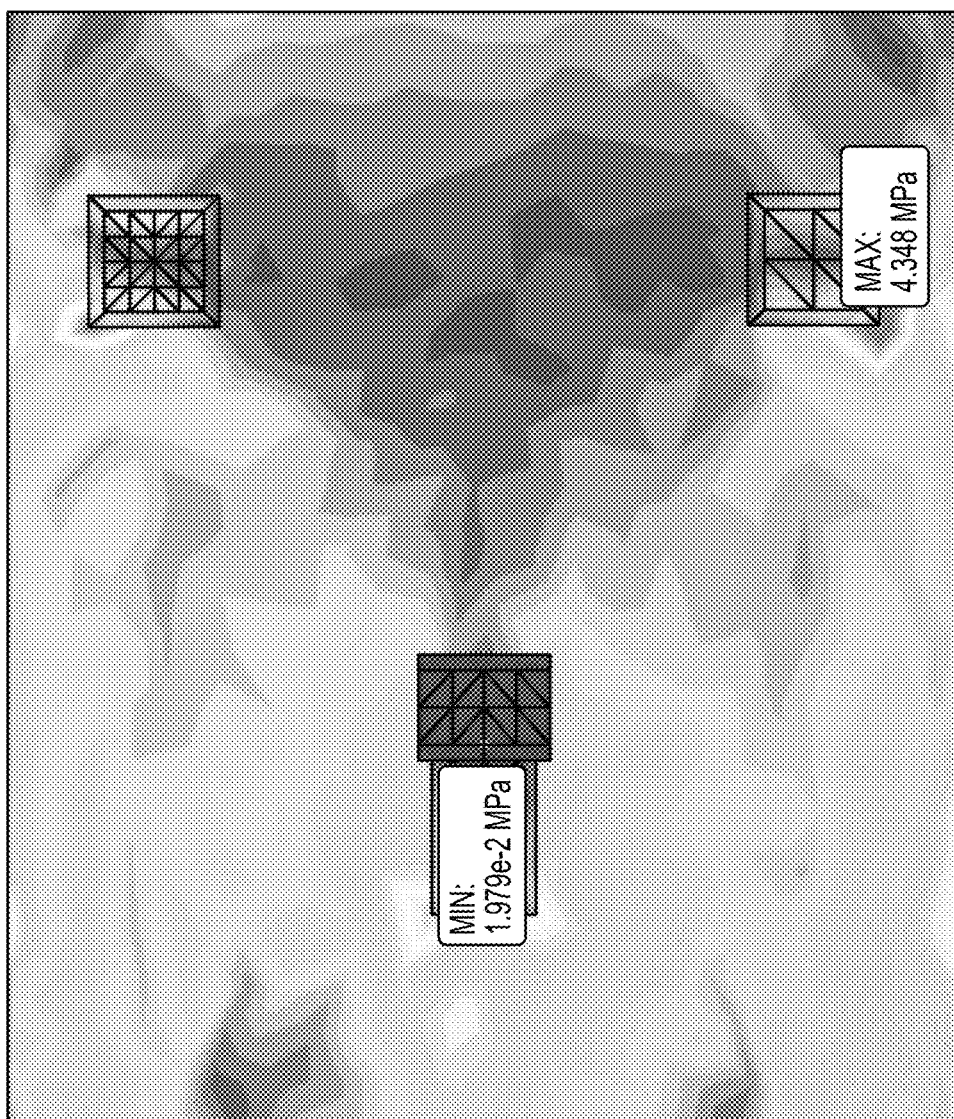
FIG. 22 is a graphic depiction of the solar panel box Von mises stress.

FEA (Finite Element Analysis) load testing was a crucial step in the design and implementation of the present portable solar generator. Using SimScale, the performance of the solar panel box and the electrical component box were tested under various loads and conditions. The aim of this testing was to determine the strength and durability of the components, and to ensure that the generator would perform optimally in real-world use. As depicted in FIGS. 20-22, the results of the FEA load testing showed that the electrical component box had a maximum stress of 218 kPa with a 5000 N load on top, while the solar panel box had a maximum stress of 4.8 MPa. These results demonstrate the ability of the components to handle the loads they may encounter in the field and provide confidence in the overall design and performance of the generator. The yield strength of the 7075 aluminum used in the construction of the generator was about 400 MPa to about 500 MPa, which is significantly higher than the maximum stress observed in the solar panel box. This indicates that the use of 7075 aluminum was a wise choice in terms of ensuring the strength and durability of the generator and provides further confidence in the results of the FEA load testing.

Figure 23:
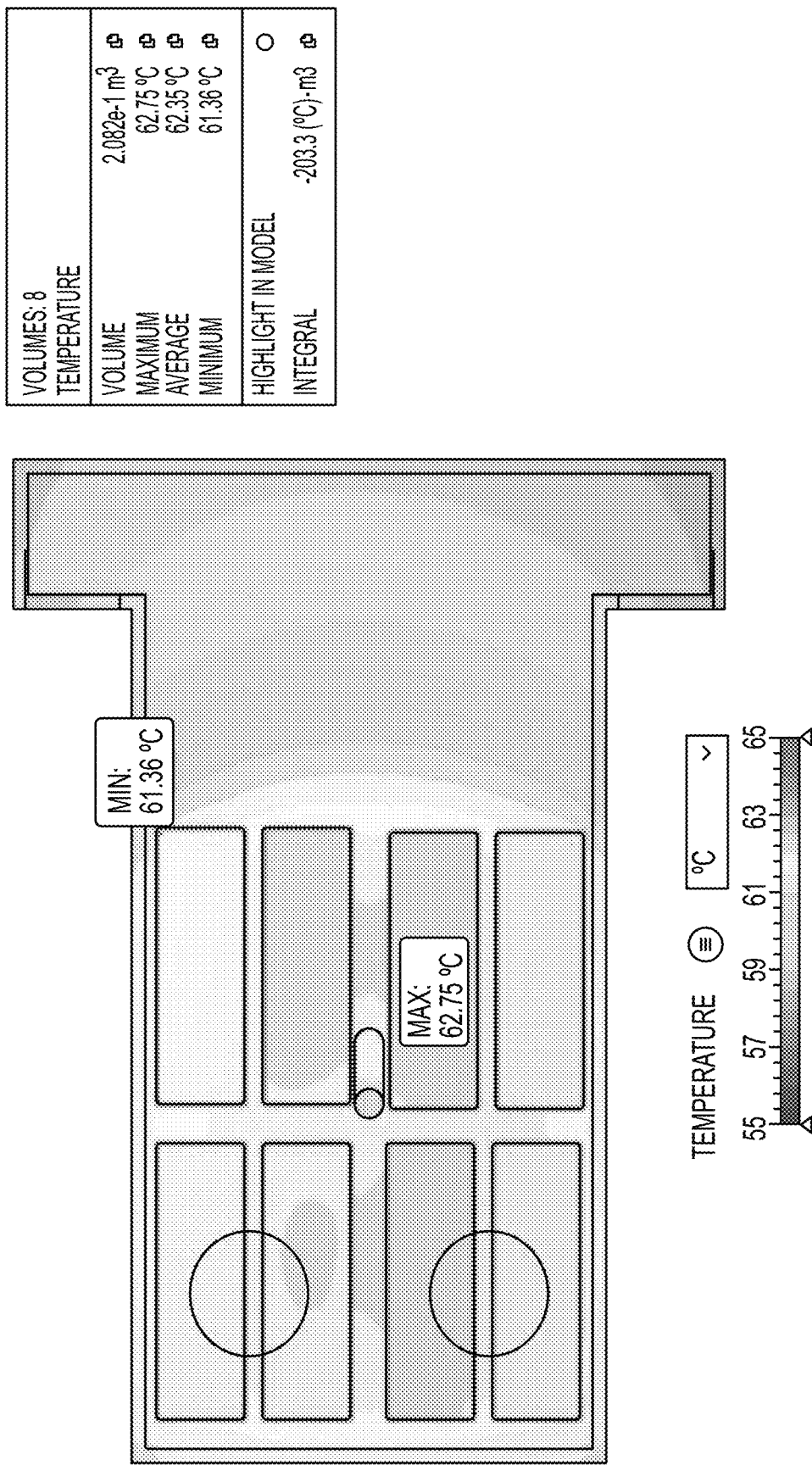
FIG. 23 is a graphic depiction of the temperature distribution of the electrical component box without heatsinks.
Figure 24:
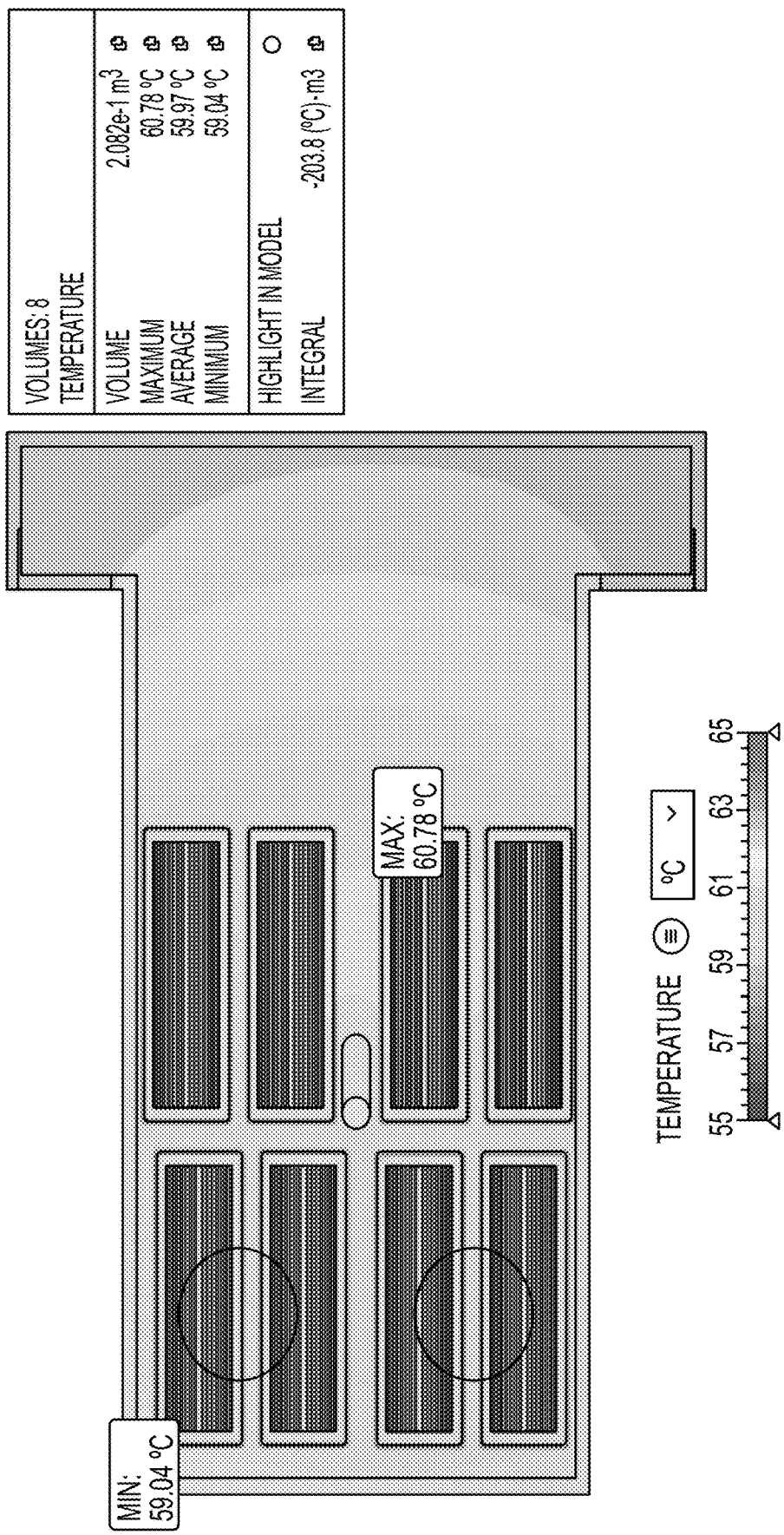
FIG. 24 is a graphic depiction of the temperature distribution of the electrical component box with heatsinks.
Figure 25:
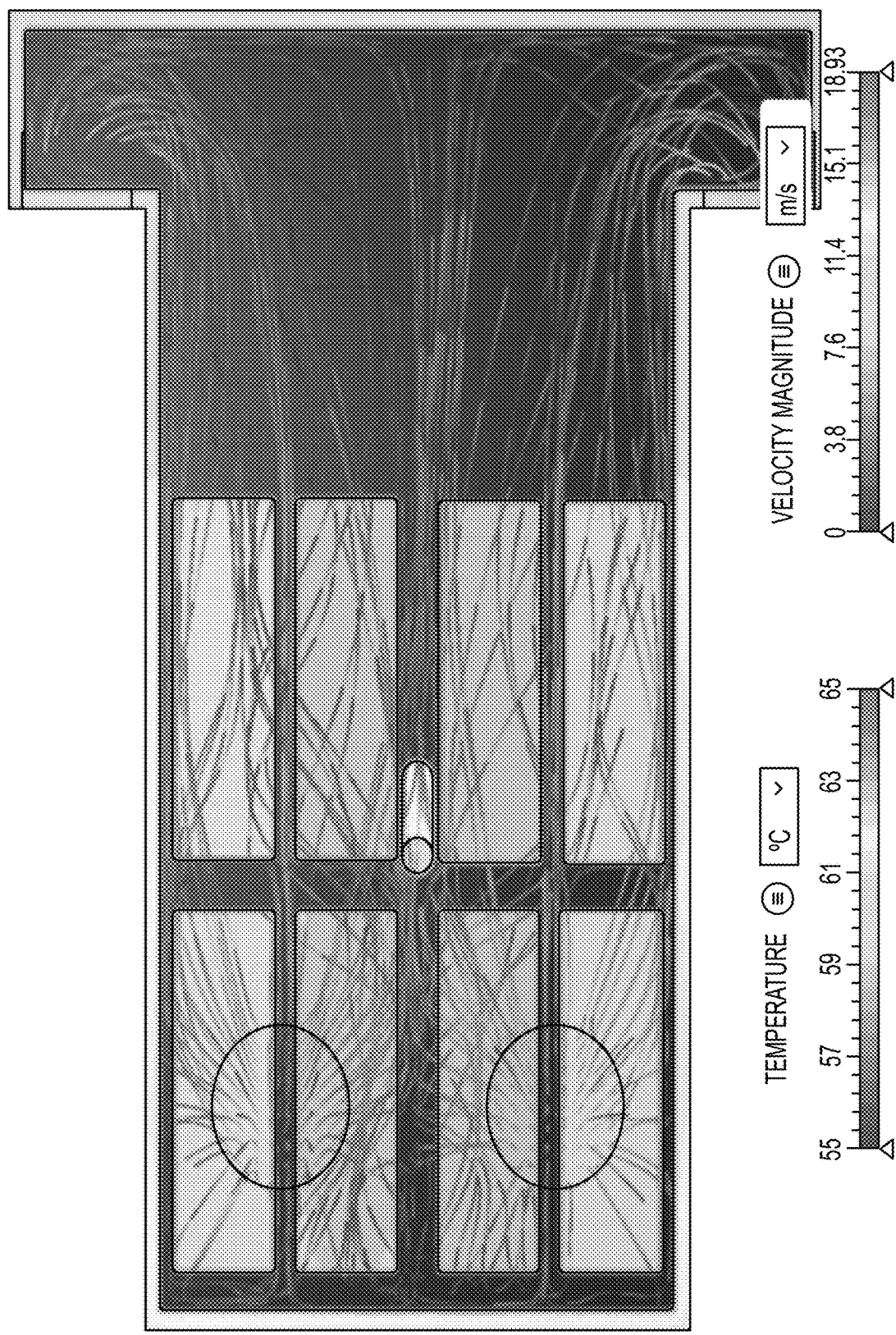
FIG. 25 is a graphic depiction of CFD airflow of the electrical component box.

The CFD calculations for the portable solar generator involved conducting two simulations with the same fan properties. Fans used with the portable solar generator had a volumetric flow rate of about 0.52 m3/s, a fan pressure of about 220 Pa, and a size of about 250×about 250 mm. In the first simulation, the electrical component box was analyzed without the addition of heat sinks. The results showed that the maximum temperature of the batteries was about 62.75° C., with an ambient temperature of about 55° C. This high temperature indicated a need for improvement in the temperature management of the batteries. In the second simulation, heat sinks were added to the design of the electrical component box. As shown in FIGS. 23-25, the results showed that the addition of heat sinks was effective in reducing the temperature of the batteries. The maximum temperature dropped to about 60.78° C., demonstrating the importance of temperature management in ensuring optimal performance of the generator.

The adoption of solar power as a renewable energy source has been rapidly growing in recent years, as people look to reduce their impact on the environment and promote sustainability. One particularly innovative solution is the present solar power system, which can be mounted on a pickup truck, a trailer, or the like, which offers a highly advanced and efficient way to generate energy. In one embodiment, the present solar power system can be mounted on a pickup truck, such as on the flatbed of a pickup truck. This can be accomplished by maintaining the solar panel component, for example, in the form of a solar panel box, separately from the rest of the system, for example, in the form of an electrical component box. The electrical component box, for example, can include other components such as the batteries, the inverter, and the like. By using these two separate "boxes", the whole combined system has a smaller footprint than would otherwise be achievable.

One of the most notable features of this system is its impressive power generation capacity. For example, in an embodiment with 8 solar panels, each capable of generating 410 W, and a total of 3280 W generated, this system is well-equipped to meet a wide range of energy needs. The advanced sun-tracking system, which uses 3 linear actuators, ensures that the solar panels are always positioned to receive the maximum amount of sunlight, maximizing the system's energy generation capabilities.

Additionally, the use of a MPPT (Maximum Power Point Tracking) controller can optimize the panels' efficiency, prolonging their lifespan and reducing maintenance needs.

In another embodiment, the system can involve the use of a 24V DC battery system, which provides reliable and efficient energy storage. With both AC and DC power output options, this battery system is ideal for a variety of applications, from remote cabins to mobile homes.

Another standout feature of this system is its compact design, which makes it a versatile and convenient solution for those in need of renewable energy. The solar panels are fully automated, with each solar panel independently being capable of being easily removed for maintenance, while the user-friendly interface and real-time monitoring capabilities make it simple to use and monitor performance.

EXAMPLES

Example 1

In one example, the present portable solar-powered generator can have the following main components:
- 24V HAWK MAX 2—LiFePO4—228 Ah—5.8 kWh (batteries).
- Panasonic EverVolt EVPV410H Solar modules.
- 4000 W—24V Pure Sine Wave Sunshine Power Inverter, Model NO. VP400024
- MPPT Regulator 150V 100 A LCD 24V, Model NO. 2006042
- Progressive Automations Solar Tracker Linear Actuator, Model NO. PA-100-18-3300-HS-24 VDC.
- Progressive Automations Track Linear Actuator, Model NO. PA-18-60-150.
- Panel Slider Rails, Radial Aero Slide 6526 1600 mm, Model NO. 4013.6526.1600
- The 2866763 PHOENIX CONTACT—POWER SUPPLY UNIT
- Arduino Portenta H7
- Light dependant resistor sensor
- DHT11 Temperature and Humidity Sensor
- HC—05 Bluetooth module
- JfBtek 8 Channel DC 5V Relay module for Arduino Raspberry Pi DSP AVR PIC ARM
- LCD Data Display
- Fan model: HA250-092D024H/HA250-092D048H
- Other components can be used as needed.

Regarding the batteries used, the 24V HAWK MAX 2—LiFePO4—228 Ah—5.8 kWh is a high-capacity lithium iron phosphate (LiFePO4) battery, which is designed for a 24V electrical system. The battery has a capacity of 228 Ah, which provides a total energy storage capacity of 5.8 kWh. The HAWK MAX 2 LiFePO4 battery offers several advantages compared to traditional lead-acid batteries, including higher energy density, longer lifespan, and better performance in extreme temperatures.

LiFePO4 batteries are known for their long cycle life, meaning they can be charged and discharged several times without significantly affecting their performance. This makes the HAWK MAX 2 battery ideal for applications where long-term energy storage is required, such as in solar generator systems, where the battery must store the energy generated by the solar panels for use during periods of low or no sunlight. The 24V HAWK MAX 2 battery is designed to be highly efficient and reliable, with a low self-discharge rate and minimal voltage sag, meaning it will maintain its voltage level during discharge. This makes the battery well-suited for use in demanding applications where consistent power output is required.

Regarding the Solar Panels used, the Panasonic EverVolt EVPV410H Solar modules are capable of outputting 9.61 A, making them a high-performance solar panel solution. With a conversion efficiency of 22.2%, the panels can efficiently convert a significant portion of the sunlight they receive into usable electricity. The panels are designed to operate in a wide range of environmental conditions and can maintain their high efficiency over a long period of time, losing only 8% of their efficiency after 25 years. In addition to their high-performance capabilities, the Panasonic EverVolt EVPV410H Solar modules are designed for ease of installation, with a lightweight and compact design that makes it possible to install multiple panels in a small space. The panels also come with a robust aluminum frame, which provides added protection and stability for the panels during transportation and installation.

The 24V Pure Sine Wave Sunshine Power Inverter (Model NO. VP400024) is a reliable and efficient device designed to convert DC power into pure sine wave AC power. With a maximum output of 4000 watts, it can power a wide range of devices and appliances, even those that require a high level of power. The inverter is compact and lightweight, making it easy to transport and install in various locations.

The Progressive Automations Solar Tracker Linear Actuator (Model NO. PA-100-18-3300-HS-24 VDC) is a high-performance actuator designed for solar tracking systems. It features a 24 VDC input, a 3300-pound load capacity, adjustable limit switches, and built-in thermal protection. The actuator is durable and reliable, capable of withstanding tough outdoor conditions, and is easy to control. With its advanced features, the Progressive Automations Solar Tracker Linear Actuator (Model NO. PA-100-18-3300-HS-24 VDC) is essential for maximizing the efficiency and output of solar panels.

The Panel Slider Rails Radial Aero Slide 6526 1600 mm (Model NO. 4013.6526.1600) serves as a durable and reliable holder for the solar panels. It allows for smooth and effortless sliding movement of the panels, providing ample space for precise and controlled positioning. The radial design reduces wind resistance, ensuring stable movement even in windy conditions. The built-in wiper system helps prevent dirt and reduce corrosion, maintaining the longevity and efficiency of the sliding system.

150V 100 A LCD 24V (Model NO. 2006042) is a state-of-the-art Maximum Power Point Tracking (MPPT) regulator. It is designed to optimize the energy conversion from the solar panels to the batteries, ensuring the maximum power output for a given set of conditions. With its advanced algorithms, it is able to continuously monitor and adjust the power output from the solar panels, providing a stable and efficient power supply to the system. The built-in LCD screen allows for real-time monitoring of the system parameters, ensuring that the user has full control over the system performance.

The Arduino Portenta H7 is a high-performance microcontroller board based on the dual-core STM32H7 microcontroller. It is designed to meet the needs of industrial and professional applications and offers a powerful combination of processing power, connectivity, and hardware security features. The Portenta H7 is equipped with two cores, a high-performance Arm Cortex-M7 and a real-time Arm Cortex-M4, which work together to provide exceptional performance and real-time capabilities. The Cortex-M7 core is capable of running at a clock speed of 480 MHz, providing the necessary processing power for demanding applications such as machine learning and computer vision. The Portenta H7 features Ethernet connectivity, Wi-Fi and Bluetooth connectivity, and a wide range of I/O options, including multiple analog and digital input/output pins, and a range of communication interfaces, such as I2C, SPI, and UART. The board also has an on-board microSD card slot, which provides additional storage options for your projects. The Portenta H7 has a wide range of power options, including USB, DC barrel jack, and Li—Po battery, which makes it ideal for a variety of portable and wearable applications. In terms of programming, the Portenta H7 can be programmed using the Arduino Integrated Development Environment (IDE) and has a range of libraries and support for a variety of programming languages, including C++ and MicroPython. The Arduino IDE provides a user-friendly and intuitive interface for programming the Portenta H7, making it easy for users of all skill levels to get started with their projects. With its advanced features, high performance, and wide range of connectivity options, the Arduino Portenta H7 is an ideal choice for a wide range of industrial and professional applications. Whether you're looking to create a complex machine learning system, a computer vision solution, or a wearable device, the Portenta H7 provides the necessary processing power and connectivity to get the job done. Light dependent resistors, also known as LDRs or photoresistors, are electronic components that are frequently used in electronic circuit designs to detect the presence or level of light. LDRs are distinct from other types of resistors such as carbon film resistors, metal oxide film resistors, metal film resistors, and others that are commonly used in other electronic designs. They are specifically designed for their light sensitivity and the resulting change in resistance.

Although other electronic components such as photodiodes and phototransistors can be used, LDRs or photoresistors are especially useful in many electronic circuit designs. They provide a significant change in resistance in response to changes in light level.

The DHT11 is a simple and inexpensive digital temperature and humidity sensor. It measures the surrounding air with a capacitive humidity sensor and a thermistor and outputs a digital signal on the data pin (no analog input pins needed). It's fairly simple to use, but data collection requires precise timing. The DHT11 Sensor is factory calibrated and outputs serial data and hence it is highly easy to set it up.

The relay permits a small amount of electrical current to control high current loads. When voltage is supplied to the coil, small current passes through the coil, resulting in a larger amount of current passing through the contacts to control the electrical load.

The solar power system mounted on a pickup truck is a truly remarkable piece of technology that provides a highly advanced and efficient solution for renewable energy generation. With a total capacity of 3280 W generated by its 8 solar panels, each with a capacity of 410 W, this system is designed to meet a variety of energy needs. The advanced sun-tracking system, equipped with 3 linear actuators, ensures that the solar panels are always positioned to receive the maximum amount of sunlight possible, making it a highly efficient solution for energy generation.

The system is equipped with a MPPT (Maximum Power Point Tracking) controller, which ensures that the solar panels are operating at maximum efficiency, thereby maximizing the energy generation capabilities of the system. The 24V DC battery system provides reliable and efficient storage of the solar energy generated, with the added convenience of both AC and DC power output options, making it ideal for a wide range of applications. The battery system is designed to provide enough power to meet the energy needs of even the most demanding of applications, ensuring that the user always has access to the energy they need, when and where they need it.

The compact design of the system makes it ideal for use in a variety of different settings, from remote cabins to mobile homes. The solar panels are fully automated and can be easily slid in and out for easy maintenance and upkeep, making it a convenient solution for those looking for a reliable source of renewable energy. Furthermore, the system is equipped with a number of advanced features, such as a user-friendly interface and real-time monitoring capabilities, that make it easy to use and keep track of its performance.

It is to be understood that the method and system for portable solar power generation is not limited to the specific embodiments described above but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A portable solar powered generator, comprising:
   a plurality of solar panels;
   a plurality of linear track actuators;
   a plurality of linear actuators;
   a plurality of LDR sensors;
   a solar panel box for storing said plurality of solar panels; and
   an electrical component box, wherein the portable solar powered generator is configured to be arranged in a pick-up truck bed,
   wherein the solar panel box is mounted atop said electrical component box while being arranged in said pick-up truck bed,
   wherein said electrical component box further comprises:
      a controller;
      a display; and
      a plurality of plugs,
   wherein said plurality of solar panels are stored within and atop said solar panel box in a closed configuration,
   wherein said plurality of solar panels stored within said solar panel box in the closed configuration are extended outward away from said solar panel box in an open configuration, and
   wherein said controller controls the position of the plurality of solar panels extended outward away from said solar panel box in an open configuration such that the panels are moved using the plurality of linear actuators to follow a sun's movement across a sky.

2. The portable solar powered generator as recited in claim 1, wherein said plurality of solar panels stored within said solar panel box is six solar panels.

3. The portable solar powered generator as recited in claim 1, wherein said plurality of solar panels stored within said solar panel box is four solar panels.

4. The portable solar powered generator as recited in claim 1, wherein said plurality of solar panels stored within said solar panel box is eight solar panels.

5. The portable solar powered generator as recited in claim 1, wherein said plurality of solar panels stored within said solar panel box are extended outward away from said solar panel box in an open configuration using the plurality of linear track actuators.

6. The portable solar powered generator as recited in claim 1, wherein said plurality of linear actuators adjust angles of the plurality of solar panels to follow a path of the sun's movement across the sky.

7. The portable solar powered generator as recited in claim 1, wherein said electrical component box further comprises a plurality of batteries for storing power.

8. The portable solar powered generator as recited in claim 1, wherein said electrical component box further comprises an inverter for converting stored DC power to AC power.

9. The portable solar powered generator as recited in claim 6, wherein said electrical component box further comprises fans for reducing air temperature within said electrical component box.

* * * * *